United States Patent [19]
Lamb et al.

[11] Patent Number: 5,406,778
[45] Date of Patent: Apr. 18, 1995

[54] ELECTRIC DRIVE RIDING GREENS MOWER

[75] Inventors: Mark E. Lamb; David E. Merchant, both of Lincoln, Nebr.

[73] Assignee: Ransomes America Corporation, Lincoln, Nebr.

[21] Appl. No.: 191,553

[22] Filed: Feb. 3, 1994

[51] Int. Cl.$^6$ .................... A01D 34/44; A01D 34/58; A01D 69/07
[52] U.S. Cl. ........................................ 56/7; 56/11.9; 180/65.1
[58] Field of Search .................. 56/7, 11.9, 14.7, 15.5, 56/15.9, DIG. 22; 180/65.1, 65.6

[56] References Cited

U.S. PATENT DOCUMENTS

| | | | |
|---|---|---|---|
| 3,090,184 | 5/1963 | Hadek | 56/7 |
| 3,103,090 | 9/1963 | Campbell | 56/6 |
| 3,106,811 | 10/1963 | Heth et al. | 56/7 |
| 3,339,353 | 9/1967 | Schreyer | 56/6 |
| 3,404,518 | 10/1968 | Kasper | 56/13.7 |
| 3,425,197 | 2/1969 | Kita | 56/10.2 |
| 3,429,110 | 2/1969 | Strasel | 56/7 |
| 3,472,005 | 10/1969 | Profenna | 56/7 |
| 3,511,033 | 5/1970 | Strasel | 56/7 |
| 3,603,065 | 9/1971 | Weber | 56/16.7 |
| 3,608,284 | 9/1971 | Erdman | 56/6 |
| 3,612,573 | 10/1971 | Hoffman | 56/7 X |
| 3,613,337 | 10/1971 | Akgulian et al. | 56/7 |
| 3,668,844 | 6/1972 | Akgulian et al. | 56/7 |
| 3,729,912 | 5/1973 | Weber | 56/320.1 |
| 3,731,469 | 5/1973 | Akgulian et al. | 56/7 |
| 3,732,671 | 5/1973 | Allen et al. | 56/10.2 |
| 3,742,685 | 7/1973 | Lian et al. | 56/7 |
| 3,759,019 | 9/1973 | Wells | 56/10.5 |
| 3,809,975 | 5/1974 | Bartels | 318/39 |
| 3,832,835 | 9/1974 | Hall et al. | 56/7 |
| 3,841,069 | 10/1974 | Weck | 56/10.5 |
| 3,910,016 | 10/1975 | Saiia et al. | 56/7 |
| 3,918,240 | 11/1975 | Haffner et al. | 56/7 |
| 3,992,858 | 11/1976 | Hubbard et al. | 56/7 |
| 4,021,996 | 5/1977 | Bartlett et al. | 56/7 |
| 4,161,858 | 7/1979 | Gerrits | 56/7 |
| 4,301,881 | 11/1981 | Griffin | 180/6.48 |
| 4,306,402 | 12/1981 | Whimp | 56/7 |
| 4,307,559 | 12/1981 | Jupp et al. | 56/11.9 |
| 4,330,981 | 5/1982 | Hall et al. | 56/7 |

(List continued on next page.)

OTHER PUBLICATIONS

Ransomes America Corporation, Turf Care Equipment Manual, 1994, portion of section entitled Ransomes Reel (Exhibit 1, 44 pages).

(List continued on next page.)

Primary Examiner—David J. Bagnell
Attorney, Agent, or Firm—Harness, Dickey & Pierce

[57] ABSTRACT

An electric drive riding greens mower includes a frame member which is supported for movement upon a plurality of ground engaging wheels and upon which are supported a battery power source, an operator station and a plurality of reel lawn mowers. An electric motor provides the driving torque for moving the mower between and over golf course greens or other surfaces to be mowed. Individual electric motors provide driving torque for each of the reel lawn mowers. Electrically driven linear actuators move the reel lawn mowers between a lowered operating position in which the reel lawn mowers engage the turf being mowed and a raised non-operating or transport position. A unique swinging arm on the frame member provides for a pivoting mount for the under-center reel mowers to facilitate service. The frame member is further efficiently constructed to facilitate ergonomic operator utilization of the mower. The frame member supports and protect various electrical and mechanical components. An operator oriented controls layout, which includes an operator communication panel, is provided on the mower. All electric operation provides for an emissionless riding greens mower which is extremely quiet in operation. Electric operation of the reel lawn mowers further provides a convenient means for on-unit backlapping as well as for operator customized mower control.

50 Claims, 14 Drawing Sheets

U.S. PATENT DOCUMENTS

| | | | |
|---|---|---|---|
| 4,370,846 | 2/1983 | Arnold | 56/6 |
| 4,487,006 | 12/1984 | Scag | 56/14.7 |
| 4,589,249 | 5/1986 | Walker et al. | 56/16.6 |
| 4,815,259 | 3/1989 | Scott | 56/6 |
| 4,866,917 | 9/1989 | Phillips et al. | 56/7 |
| 4,920,733 | 5/1990 | Berrios | 56/10.9 |
| 4,967,543 | 11/1990 | Song et al. | 56/10.8 |
| 4,995,227 | 2/1991 | Foster | 56/249 |
| 5,042,236 | 8/1991 | Lamusga et al. | 56/7 |
| 5,069,022 | 12/1991 | Vandermark | 56/6 |
| 5,343,680 | 9/1994 | Reichen et al. | 56/7 X |

OTHER PUBLICATIONS

Ransomes America Corp., Turf Care Equipment Manual, 1994, portion of section entitled Mounted/Trailed (Exhibit 2, 6 pages).

Ferris Industries Advertisement for Ferris, Hydrowalk 36, Jan. 1991, Yard and Garden (Jan., 1991) p. 30 (Exhibit 3, 1 page).

Ferris Industries, Advertisement for Hydrowalk 36/48, Jun. 1990 (Exhibit 4, 2 pages).

The Grasshopper Co., Brochure on Model 718/718K, 1988 (Exhibit 5, 2 pages).

Walker Manufacturing Co., Owners Manual for Model MS36–42 and MC36–54, 1987, pp. 1–45 (Exhibit 6, 47 pages).

Gravely International, Brochure for Pro Series, Sep. 1986, pp. 1–10 (Exhibit 7, 11 pages).

Bunton Company, Brochure on Bunton Mowers, 1986, pp. 1–20 (Exhibit 8, 20 pages).

Ferris Industries, Brochure on Pro Cut Mower, date unknown (Exhibit 9, 4 pages).

Wheel Horse, Parts and Service Manual for Dixie Chopper 5018 Magnum, date unknown (Exhibit 10, 3 pages).

WO 93/12641, Dana R. Lonn et al., Electronic Control for Turf Maintenance Vehicle, Jun. 1993.

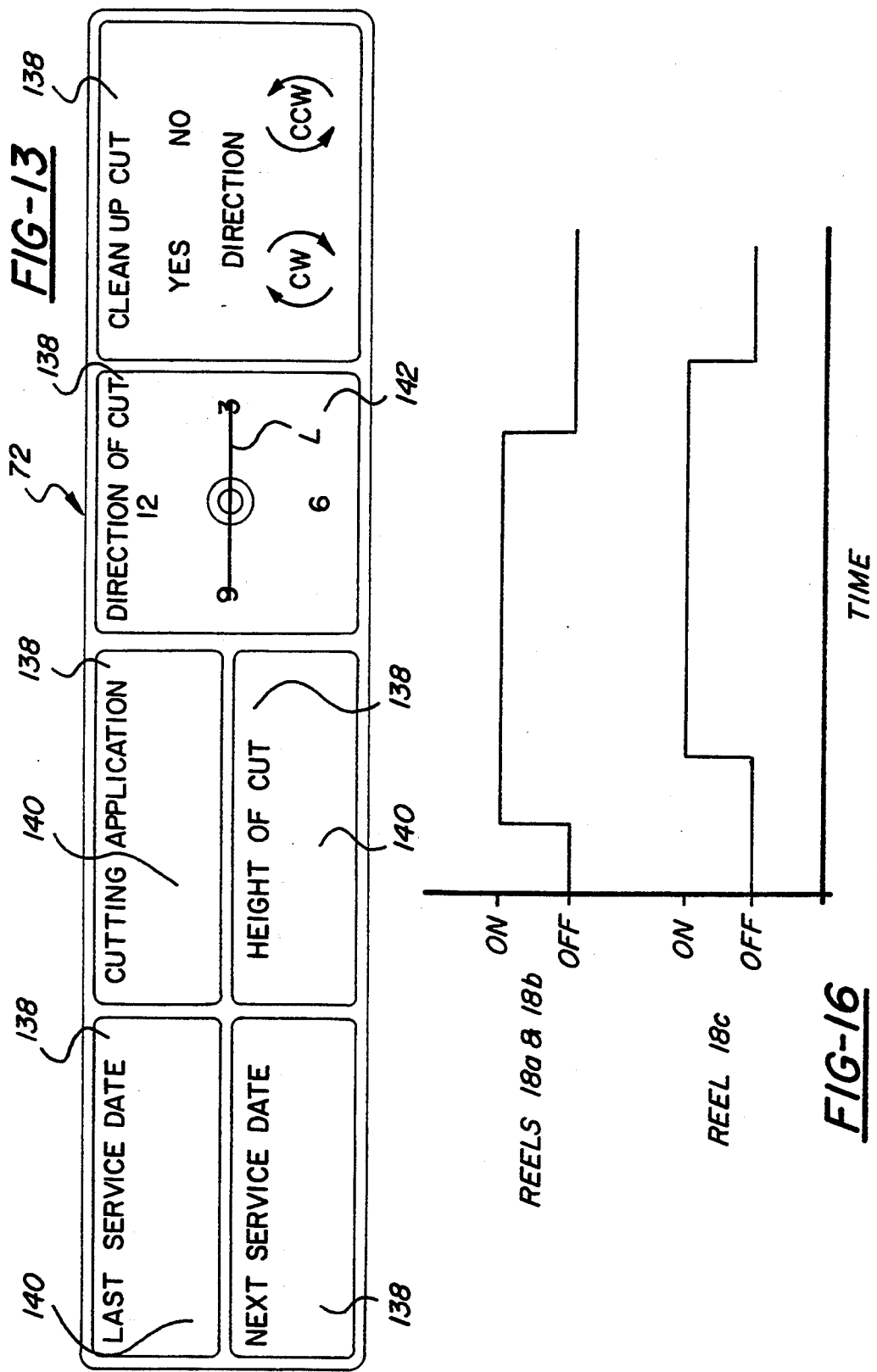

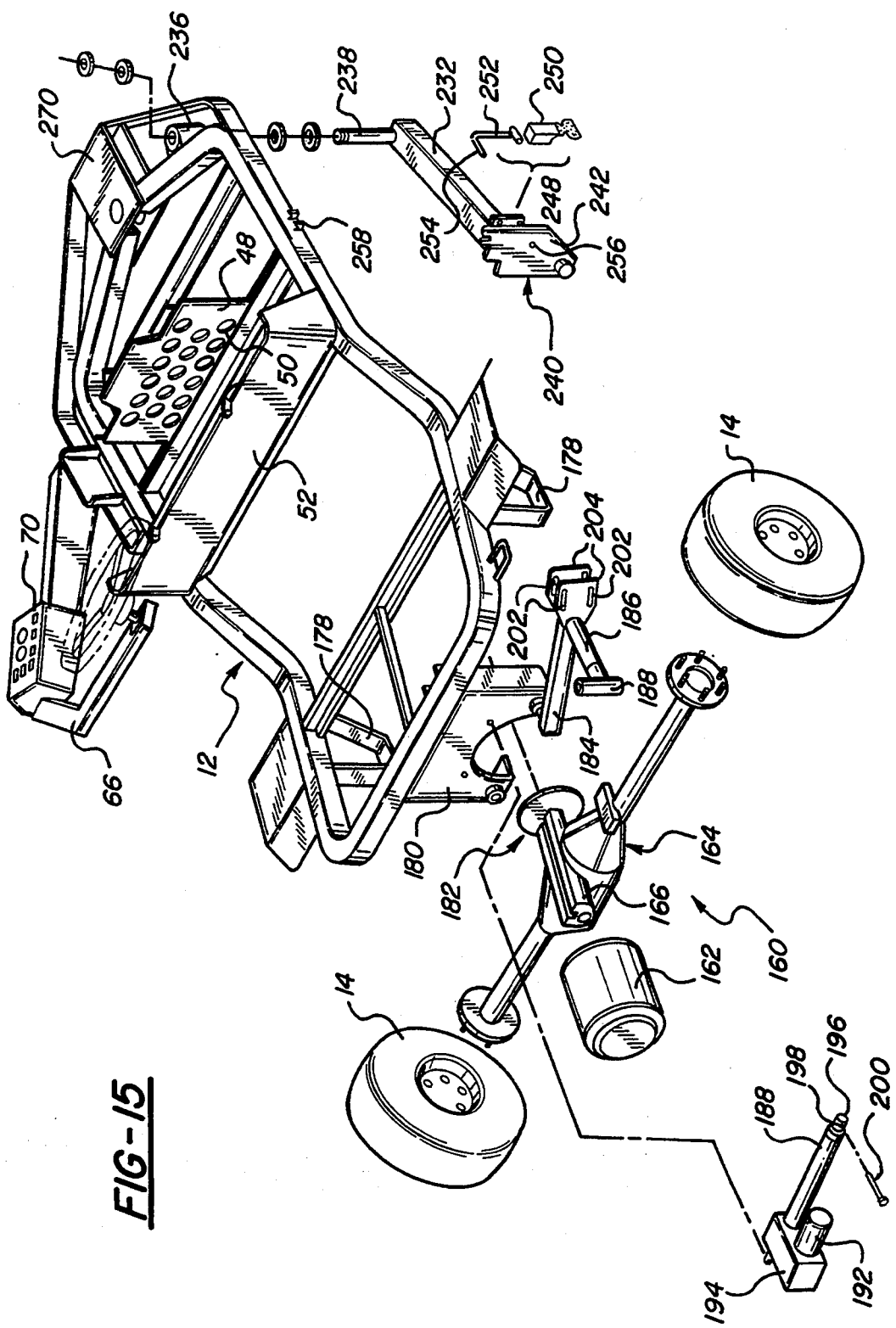

ELECTRIC DRIVE RIDING GREENS MOWER

BACKGROUND OF THE INVENTION

1. Field of the Invention

The present invention relates generally to turf care equipment, and more particularly, to an all electric operation riding greens mower.

2. Discussion

There are known a wide variety of lawn mowers including: powered or non-powered, riding, towed or walk behind, multiple or gang, reel or rotary, and so on type lawn mowers. Most of these mowers are capable of doing a fine job of mowing the lawn around the family home, the grass along the side of the road and around commercial buildings or on the fairways and rough areas of golf courses. Mowing of golf course greens, however, requires a very precise mower specifically designed and engineered to ensure a consistent close cropped cut of the green turf. In addition, because of the time required to grow a golf course green, sometimes several years to full maturity, and the cost associated with starting and maintaining a green, generally tens of thousands of dollars, it is vitally important that the mowing unit operate properly and not damage the green.

A number of greens mowers are known in the art and are discussed in U.S. Pat. Nos. 3,425,197; 3,429,110; and 4,021,996. A more specific type of greens mower, a riding greens mower with multiple or gang cutting units is the subject of and discussed in U.S. Pat. Nos. 3,511,033; 3,668,844; 4,866,917; and 5,042,236. Common among the mowers discussed in these patents is the reliance on an internal combustion engine as a source of power, and complex drive mechanisms or hydrostatic systems for supplying power to the ground engaging wheels and the reel mowing units. These machines suffer a number of disadvantages. For example, use of internal combustion engines make the machines inherently noisy thus limiting the hours of the day during which they may be used without disturbing golf course neighbors or golfers who may be playing on adjacent areas. These machines, and particularly the machines which rely on hydrostatic drive systems, have the potential to severely damage a green unless careful precaution is taken to prevent the leakage or spillage of fuel, lubricating oil and hydraulic fluid. These machines also inherently produce emissions as a result of burning hydrocarbon based fuels in the internal combustion engines. In addition, the non-hydrostatic machines generally require substantial maintenance, adjusting and/or replacing of belts, drive members and the like, for sustaining operation of the machine. The hydrostatic machines require dogged checking and topping off of hydraulic fluid as well as painstaking checking of the hydraulic hoses and connection for leaks. All of the machines require periodic maintenance to change lubricants within and to tune the internal combustion engines.

SUMMARY OF THE INVENTION

The present invention provides an all electric drive riding greens mower. The mower includes a frame member which is supported for movement upon a plurality of ground engaging wheels and upon which are supported a battery power source, an operator station and a plurality of reel lawn mowers. An electric motor provides driving torque for motivating the mower between and over golf course greens or other surfaces to be mowed, and individual electric motors provide driving torque for each of the reel lawn mowers. Electrically driven linear actuators are also provided and facilitate moving the reel lawn mowers between a lowered operating position in which the reel lawn mowers engage the turf being mowed and a raised non-operating or transport position. The unique frame member provides a pivoting mount for at least one of the reel mowers to facilitate Service and is further ergonomically constructed to facilitate efficient operator utilization of the mower. The frame member is further efficiently utilized to support and protect various electrical and mechanical components. Operator orientated controls layout and an operator communication panel facilitate efficient utilization of the mower. All electric operation provides for an emissionless riding greens mower which is extremely quiet in operation. Electric operation of the reel lawn mowers further provides a convenient means for on unit backlapping as well as for operator customized mower control.

The unique and efficient frame construction of the riding greens mower of the present invention provides the rigid structure required for such a mower. Most of the frame members, however, are multi-purpose. Hence, the battery power source, the reel mower mounting structure, the drive axle and electric motor mounting structure, the seat support structure, the foot deck structure and other portions of the frame assembly serve multiple purposes in a highly efficient design. The frame is designed with an outer periphery tubular structure interlinked with support members. Therefore, a rigid structure can be provided without substantial use of gussets or other reinforcements. This frame design further provides for a riding greens mower which is light in weight. Each of these considerations are highly important for preventing soil compaction, which can damage a green, due to the weight of mower.

The greens mower of the present invention is laid out in a three wheel design with two wheels mounted towards the front of the unit on a common drive axle. This arrangement facilitates driving both of these wheels from a single electric motor, again reducing the weight of the unit. The mower has an elongated frame structure which, while enhancing the stability of the mower, provides for positioning the battery power source behind and under the operator. The third wheel is positioned at the rear of the mower on a pivoting mount for steering the vehicle. The wide spacing of the front ground engaging wheels allows for maintaining the track of the rear wheel within the track of the front wheels through turns which enhances the stability of the mower. In addition to the liberal use of tubular and multi-purpose frame members, all of the frame members are formed to facilitate weight reduction.

The tubular frame structure can provide for routing the electrical wiring and steering cable assembly through the frame members. This feature of the riding greens mower can eliminate a number of mounting brackets and hardware and also reduce or eliminate protective sheathing which would otherwise be required for mounting and protecting the wiring and cable assemblies. The frame construction also provides for housing most of the electrical control elements conveniently on a common panel which, when in a closed position, is the operator foot deck. The panel can easily pivot to an open position, however, to allow access to the electrical components for service or inspection. The foot deck is ergonomically angled for enhancing operation and for allowing water which may accumulate within the housing to drain through apertures formed therein.

The all electric operation of the riding greens mower of the present invention provides numerous advantages over previously known mowers. For example, the mower is extremely quiet in operation. Hence, greens near homes may be mowed without disturbing the homeowners, or greens adjacent playing areas can be mowed without disturbing golfers. The unit also does not produce emissions, and the possibility of spilling fuel, lubricating oil or hydraulic fluid is eliminated.

The electric operation of the riding greens mower reduces maintenance. The mower need only be connected to a recharger after use. On a full charge, the mower is capable of mowing in excess of 20 greens, including traveling therebetween. Therefore, one or two units can easily handle the greens mowing requirements for an average golf course. The mower is specifically designed to reduce maintenance. For example, the reel mowers can be conveniently backlapped on the unit through adding an external backlapping motor or through a simple adaptor which allows for operating the reels in reverse via the reel drive motors. The center reel of the unit is designed to easily pivot out from under the unit for service. And, the battery cover is vented such that it does not have to be removed during charging.

In addition to being efficiently designed and easy to maintain, the riding greens mower is easy and convenient for the operator to use. The mower is designed with an arm structure which supports the steering wheel as well as most of the control elements and gages within easy view and reach of the operator. Adjacent the seat, an assist bar is provided for helping the operator on and off the unit. Drive, brake and reel motor control elements are positioned for easy reach by the operator's foot on the ergonomically angled foot deck made integral to the frame structure. In addition, a communication panel is provided. The communication panel allows the golf course greens supervisor to easily and conveniently communicate, through erasable messages, to the operator which greens to mow, how to mow them and when to bring the unit in for service, just as an example. The erasable nature of the messages allows the supervisor to set up the machine on a daily basis, and to send the operator out with clear instructions for the day.

These and other advantages and features of the present invention will become readily apparent from the following detailed description, subjoined claims and drawings.

BRIEF DESCRIPTION OF THE DRAWINGS

FIG. 13 is an enlarged view of the communication panel;

FIG. 15 is a perspective view of the frame member and includes an exploded assembly perspective of the drive assembly and of the pivoting center reel mounting assembly;

FIG. 16 is a timing diagram illustrating the on/off delay operation of the center reel mower of the electric drive riding greens mower of the present invention.

DETAILED DESCRIPTION OF THE PREFERRED EMBODIMENTS

Figure 1:
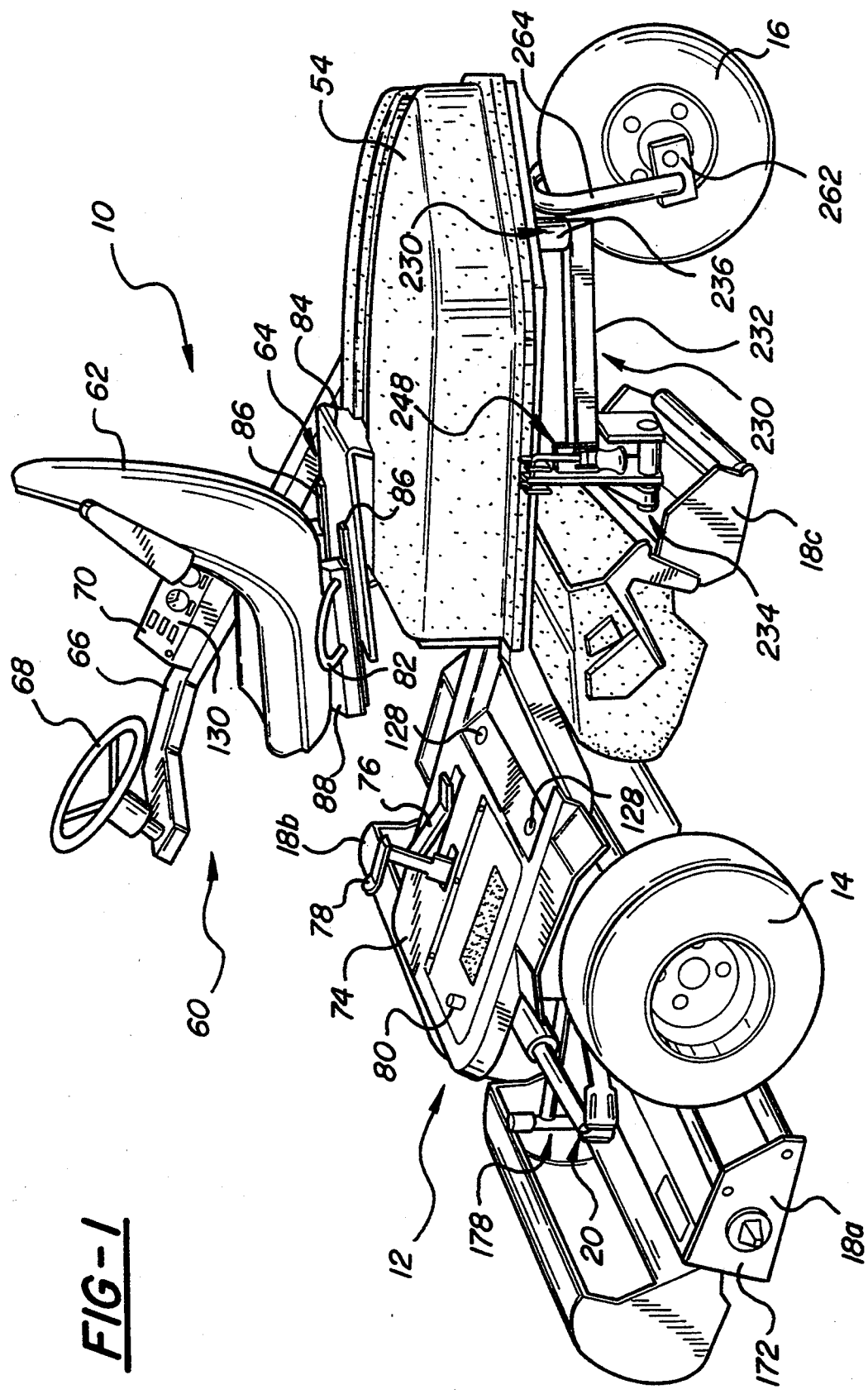
FIG. 1 is a left perspective view of the electric drive riding greens mower of the present invention.
Figure 2:
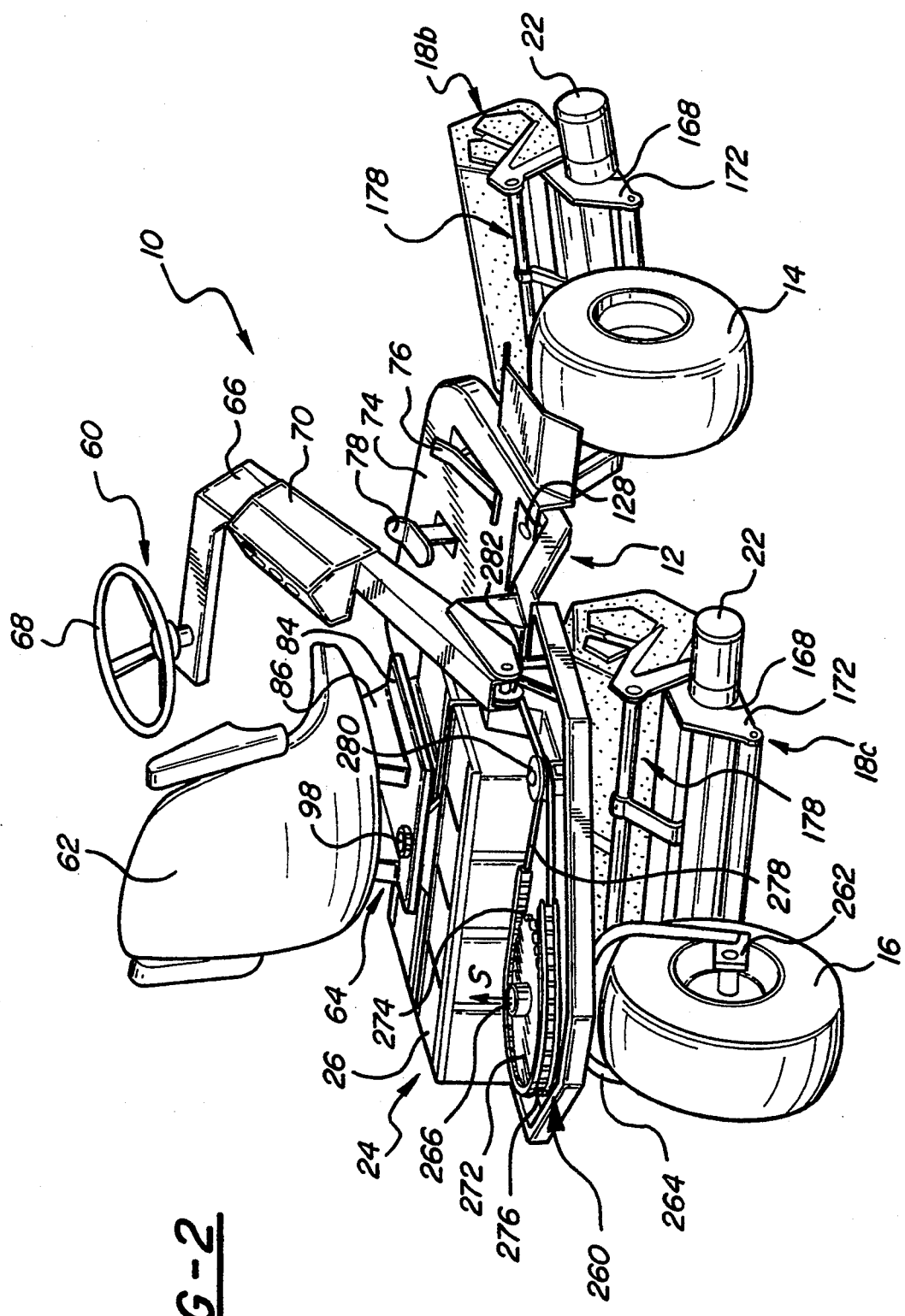
FIG. 2 is a right perspective view of the electric drive riding greens mower of the present invention.

The present invention is directed to an all electric operating riding greens mower. For purposes of providing a detailed description of the preferred embodiments of the invention, the invention is described as follows embodied as an electric triplex greens reel mower having a frame supported on three wheels, three reel type lawn mowers supported from the frame member, an operator station including a seat from which an operator controls the function of the mower and an on-board battery power source of electrical energy. It should be readily understood that the teachings of the present invention are not limited to the specific type of greens mower described herein and can be extended to a variety of applications in the turf care industry and elsewhere.

FIGS. 1–6 illustrate the general arrangement of electric riding greens mower 10. Mower 10 includes a frame 12 supported for movement on forward drive wheels 14 and rear steerable wheel 16. Three reel type lawn mowers 18a, 18b and 18c, respectively, are supported from frame 12 by reel lift assemblies 190. Two of the reel lawn mowers 18a and 18b, are disposed at the forward corners of frame 12 and the third reel lawn mower 18c is centrally disposed below frame 12. This arrangement assures that the mowers precede the ground engaging wheels such that the green turf is mowed prior to being traversed by the ground engaging wheels thereby ensuring a precise and consistent length of cut.

Each of the reel lawn mowers are driven by an electric reel mower motor 22 which is supplied with electrical energy from on-board battery power source 24. Battery power source 24 preferably provides between about 12 volts to 96 volts of electrical force. In the preferred embodiment, battery power source 24 includes eight six-volt-lead-acid batteries 26 connected in series to provide 48 volts of electrical force and further providing capability for cutting between in excess of 20 average golf course greens including transportation of mower 10 between the greens. As will be appreciated, lower bakery voltages may be used with smaller units while higher battery voltages may be used with larger units such as five gang fairway mowers. Battery power source 24 is rechargeable, and it should be readily understood that any type of batteries, such the above-mentioned lead acid or nickel cadmium (NiCad) batteries, may be used with mower 10. Battery power source 24 also provides electrical energy to a drive motor 162 which is adapted to provide driving torque through a drive axle 164 to each of the drive wheels 14 for propelling mower 10 over a green being mowed or between greens. Drive motor 162 is capable of providing an average cutting speed for mower 10 of approximately 3.8 miles per hour (MPH) during mowing operations and approximately 7.5 MPH during transport.

Figure 7:
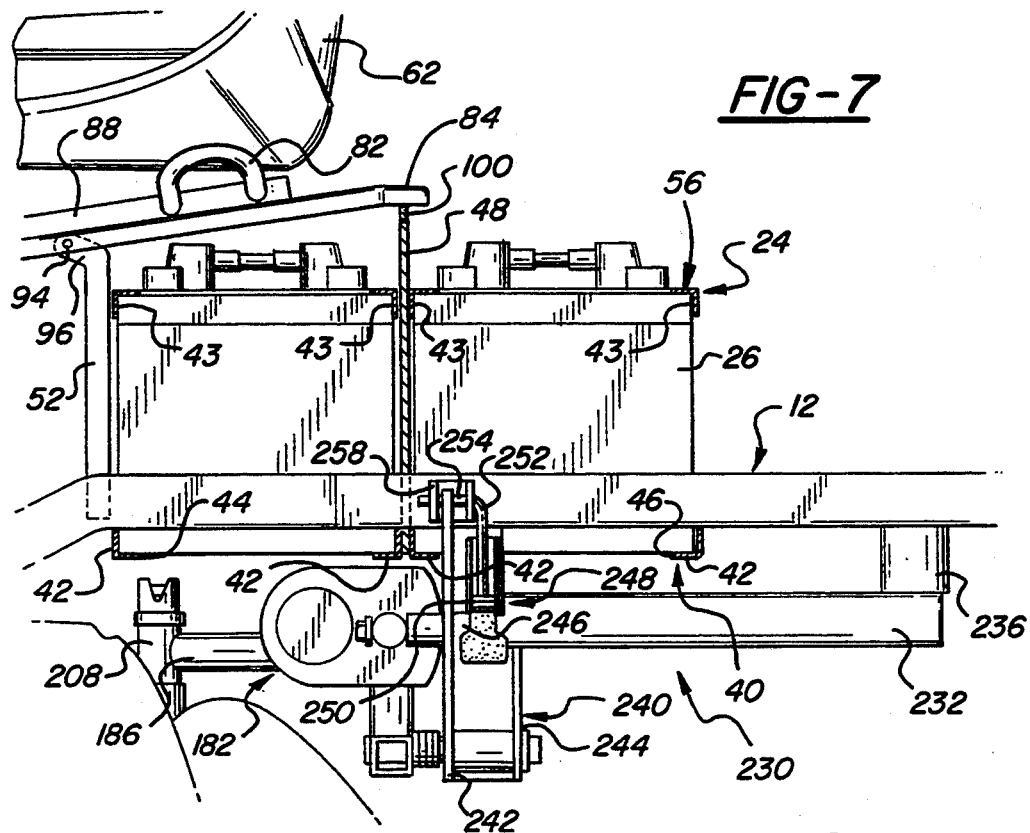
FIG. 7 is an enlarged side view of the electric drive riding mower of the present invention further illustrating the seat support assembly, the battery power source support assembly and partially illustrating the center reel mower swing arm and latch assembly.
Figure 8:
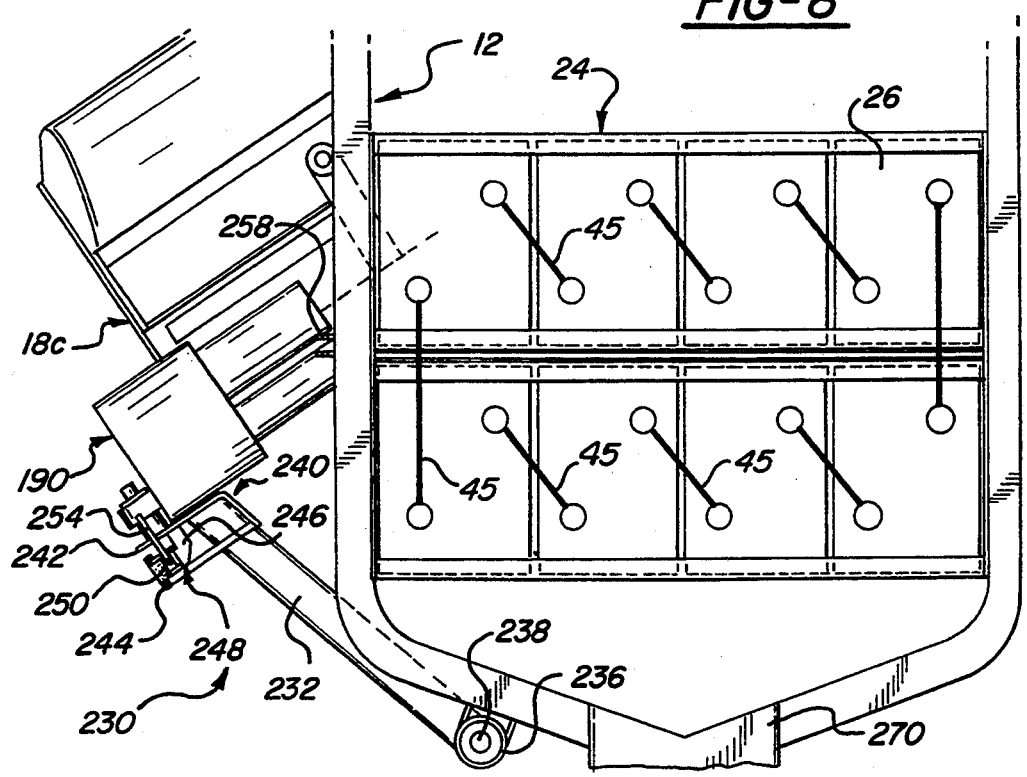
FIG. 8 is an enlarged top view of the electric drive riding mower of the present invention further illustrating the batteries and illustrating the center reel mower swing arm assembly partially rotated from an operative position to a service position.
Figure 14:
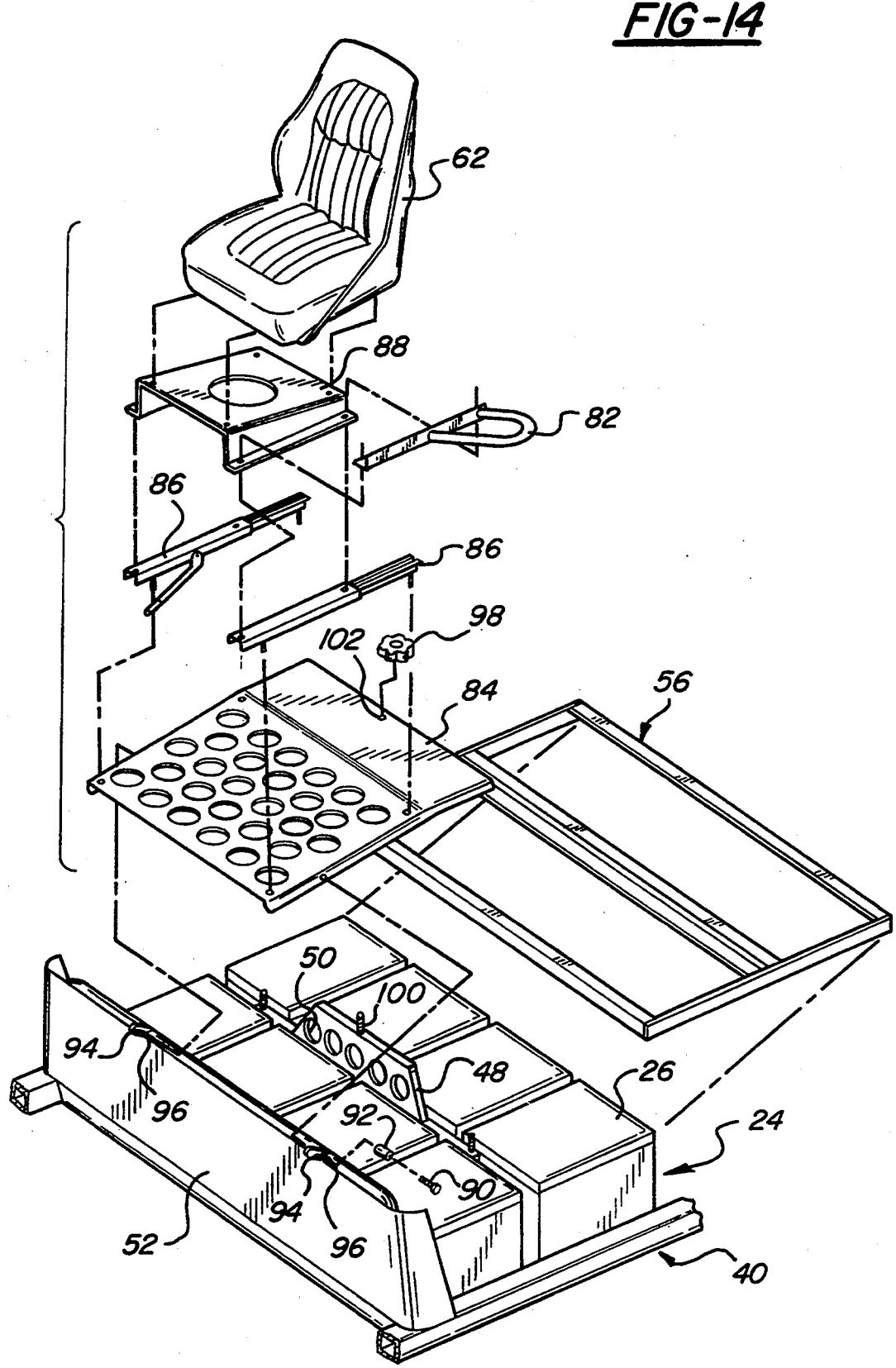
FIG. 14 is an exploded assembly view of the operator seat support assembly and integrated battery power source support member.

Referring to FIGS. 7 and 14, battery power source 24 is secured to a battery support 40 which is made integral to a rearward portion of frame 12. Battery support 40 includes a plurality of transverse "L" shaped members 42 which define a pair of channels 44 and 46, respectively. Channels 44 and 46 are sized to receive the eight lead-acid batteries 26 of battery power source 24 in two rows of four. Channels 44 and 46 are separated by a vertical plate member 48 which also forms a portion of a seat support 64. Vertical plate member 48 is formed with a plurality of apertures 50 to reduce its weight and hence the overall weight of mower 10. The forward channel 44 is further shielded from the forward portion of mower 10 by contoured vertical plate member 52 which also forms a potion of seat support 64. Once secured into battery support 40, upper support member 56, also constructed from a plurality of "L" shaped members is secured over the tops of batteries 26. Batteries are then connected in series via jumpers 45 as shown in FIG. 8 to provide up to approximately forty-eight volts of electrical force. In operation, as show in FIGS. 1 and 6, battery power source 24 is covered with a vented cover 54. Cover 54 has a dome shaped contour and overlaps the outer portions of frame 12 to cover battery power source 24 as well as steering mechanism 260. Cover 54 further includes an aperture 58 which is located at the apex of the domed shape. Aperture 58 permits the escape of gases generated during recharging of the batteries 56 without having to remove cover 54. Additional apertures 57 are formed in the upper side portions of cover 54 into which vented plugs 59 are inserted for further ensuring adequate ventilation of battery power source 24.

Figure 12:
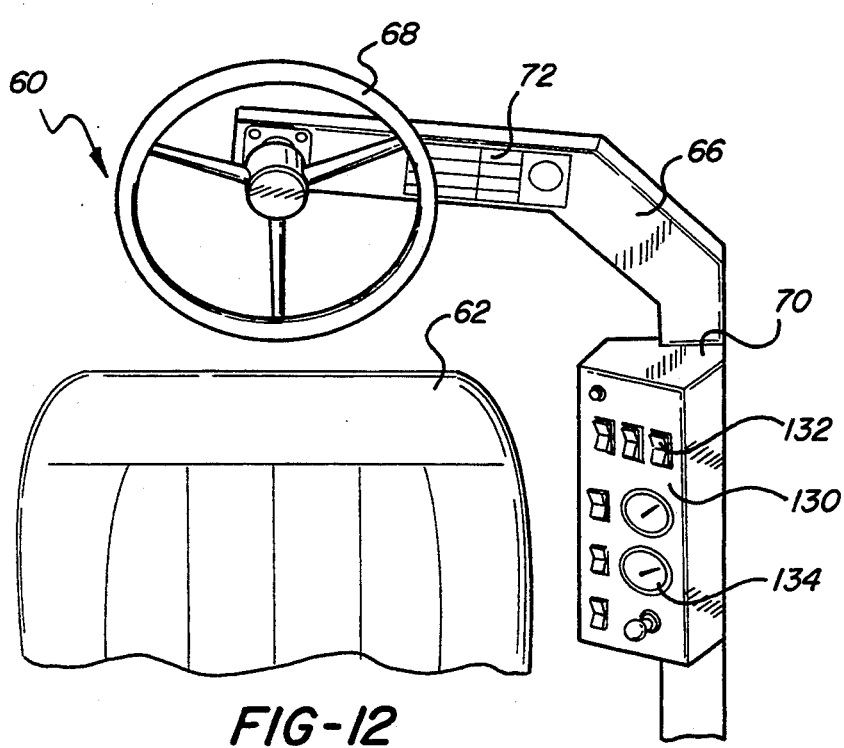
FIG. 12 is an enlarged partial top view of the electric drive riding mower of the present invention illustrating the operator station including the steering wheel, the communication panel and the control panel.

Mower 10 is operated from an operator station 60 which includes a seat 62 supported above frame 12 and battery power source 24 by seat support 64. Operator station 60 also includes a control support arm 66 which is secured to a rearward portion of the frame 12. Control support arm 66 extends forwardly and around the seat 62 such that a steering wheel 68 is located directly in front of the operator and a control module 70 for housing the control elements such as control switches and indicators is within view and reach of the operator. Located on control support arm 66 and adjacent steering wheel 68 is a communication panel 72, as best seen in FIG. 12, which will be described in more detail hereinlater, and which is operable for displaying mowing and operating instructions to the operator. Formed integral to frame 12 and associated with operator station 60 is foot deck 74. Foot deck 74 is ergonomically angled for operator comfort and ease of reaching the drive pedal 76, brake pedal 78 and reel mower activation switch (mow switch) 80. Seat 62 further includes an assist handle 82 for assisting the operator on and off mower 10.

FIGS. 7, 14 and 15 illustrate seat support 64 including vertical plate member 48, contoured vertical plate member 52 and assist handle 82 and further including horizontal plate member 84, track members 86 and seat base support 88. Threaded fasteners 90 and bushing 92 pivotably secure a first end of horizontal plate member 84 to apertures 94 formed in tabs 96 formed on contoured vertical plate member 52. In a first position, horizontal plate 84 is supported on vertical plate member 48 and is secured by a threaded knob 98 which engages a stud 100 extending vertically upwardly from vertical plate member 48 and passing through aperture 58 in cover 54 and an aperture 102 formed in horizontal plate 84.

Seat 62 and assist handle 82 are secured to base support 88 such as by threaded fasteners, and base Support 88 is secured to track members 86. Track members 86 are operable for allowing fore and aft adjustment of seat 62 relative to the seat support 64 and hence from structure 12 of mower 10 to enhance operator comfort and ease of operating mower 10. Track members 86 are secured, such as by threaded fasteners, to horizontal plate 84. To allow access to battery power source 24, threaded knob 98 is detached from stud 100, and seat 62, including base support 88, track members 86 and horizontal plate 84, may be pivoted to a past vertical position for removing cover 54 and accessing battery power source 24 and steering mechanism 260. It should be noted that assist handle 82 also pivots with seat and therefore may be used to assist in pivoting seat 62 as well as for assisting an operator on and off mower 10.

Figure 10:
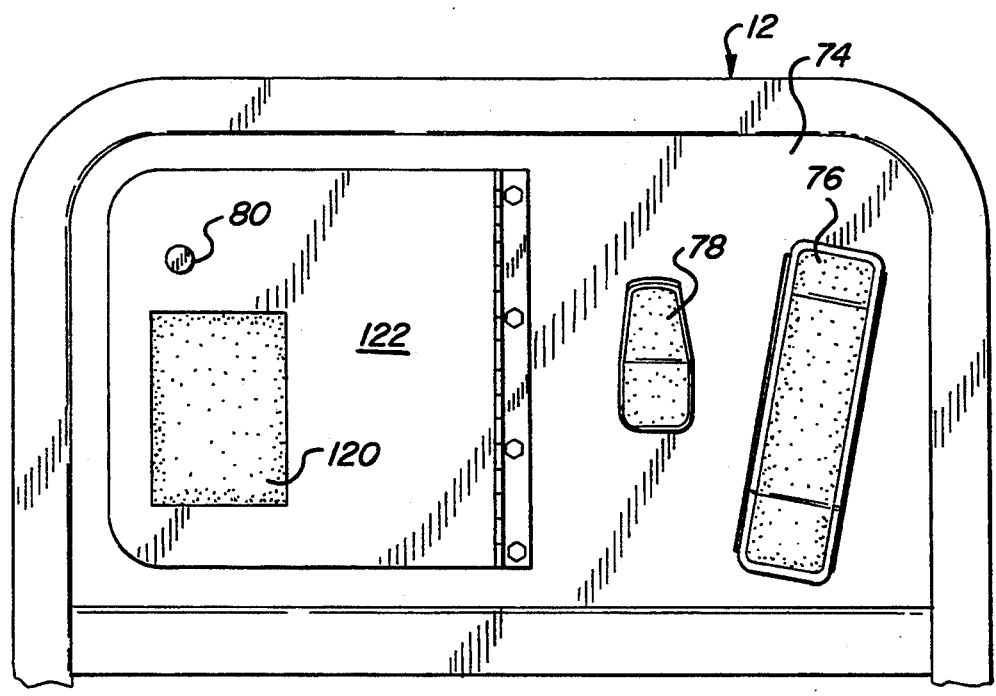
FIG. 10 is an enlarged top view of the electric drive riding mower of the present invention illustrating the foot deck layout including the drive pedal, the brake pedal, the reel type mower operation switch and the pivotable electrical component mounting panel in the closed position.
Figure 11:
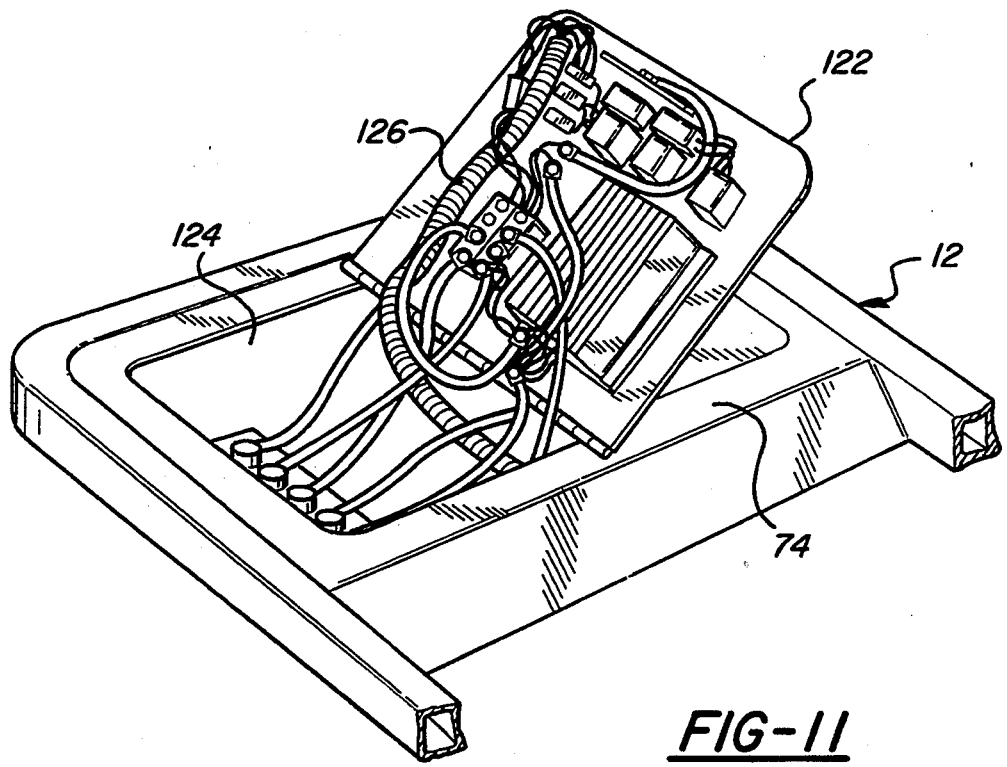
FIG. 11 is an enlarged perspective view of the electric drive riding mower of the present invention illustrating the foot deck and particularly illustrating the electrical component mounting panel in an opened position.

FIGS. 10 and 11 illustrate the details of the ergonomically oriented foot deck 74. As seen in FIG. 10, foot deck 74 includes a drive pedal 76, a brake pedal 78 and mow switch 80 the functions of which will be described later. Both the drive pedal 76 and the brake pedal 78 are covered with a non-slip surface coating as is a portion 120 of foot deck adjacent the mow switch 80.

Figure 3:
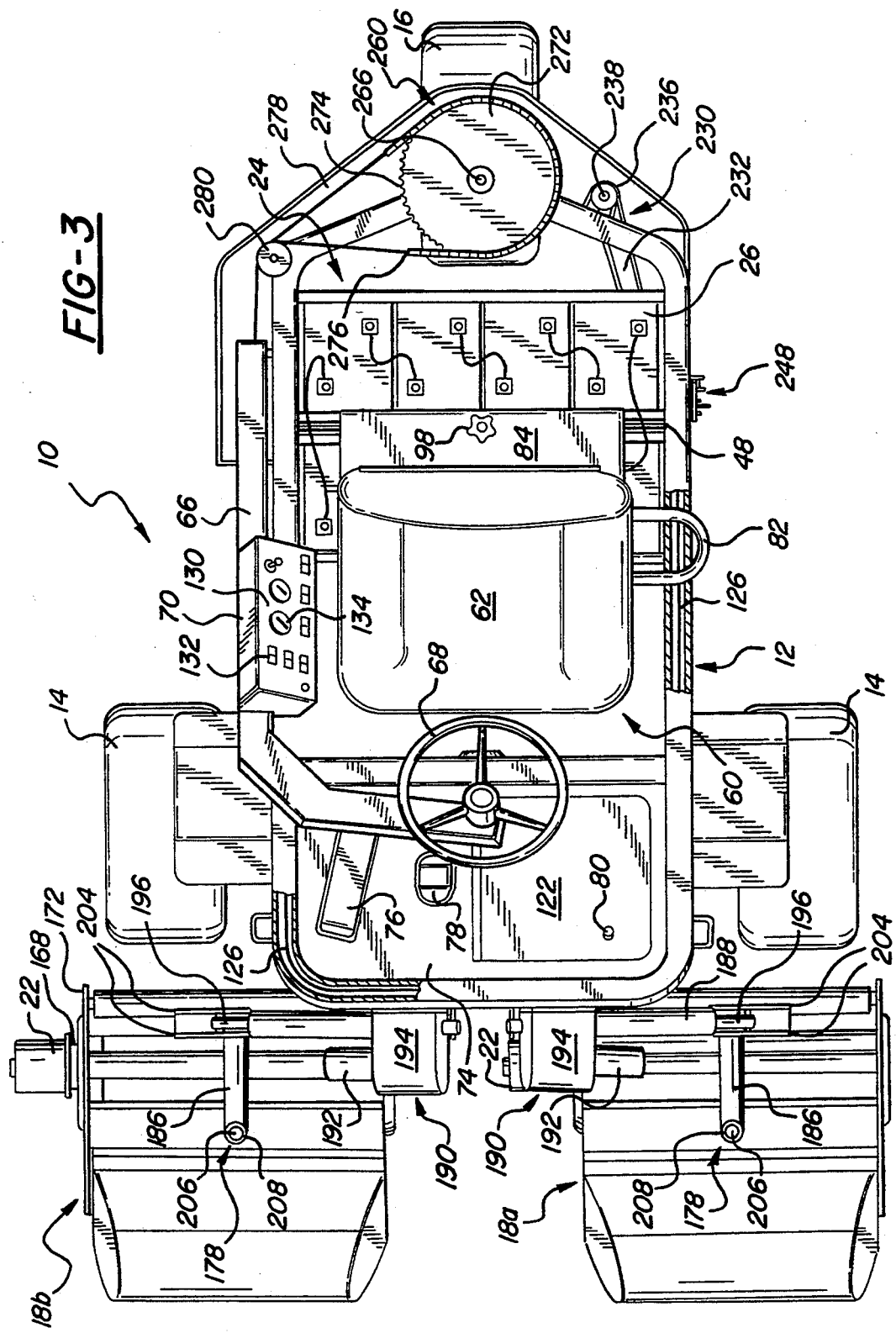
FIG. 3 is a top view of the electric drive riding greens mower of the present invention and illustrates features of the mower generally disposed above the frame member.

As can be seen in FIG. 11, a portion of foot deck 74 is a panel 122 which is hingedly mounted to the foot deck 74 and can be opened to reveal the electrical components and wiring connections for mower 10 which are mounted in a compartment 124 under the foot deck or to the panel 122 itself. Nearly all of the electrical components are mounted to this panel which can be easily opened to provide service to the electrical components as required. The electrical components mounted to panel or in compartment are connected to the other portions of mower 10 by a wiring harness 126. In addition, constructing frame 12 from tubular stock materials can provide an integral conduit for routing wiring harness 126 to the various electrical components. FIG. 3 illustrates the routing of wiring harness through tubular frame 12. In this manner a number of brackets and tie-downs necessary for securing wiring harness 123 to mower 10 can be eliminated as well protective sheathing which would be required if wiring harness 126 were exposed thereby saving on cost and weight of mower 10. In addition compartment 124 is formed with apertures 128 which allow for water which may accumulate in compartment 124 to drain due to the angle of foot deck 74.

FIG. 12 further illustrates features of operator station 60 including the position of steering wheel 68 mounted to control support arm 66 in its relation to seat 62. In addition, a control panel 130 is provided and secured to control support arm 66. Control panel 130 contains a plurality of electrical switches generally indicated at 132 for changing the operating conditions of mower 10 as well as a of plurality gages 134 to monitor the operation of mower 10. As will be described, switches 132 are provided and secured to control panel 130 for selectively controlling operation of reel mowers 18a, 18b and 18c, activating the head-light 304 and the like. Also, indicator gages 134 show hours of operation, battery charge state, and the like.

Also shown in FIG. 12 associated with control support arm 66, and better seen in FIG. 13, is a communication panel 72. Communication panel 72 is secured to control support arm 66 such as by adhesive, hook and loop fasteners or by securing it under a clear plastic panel. Communication panel 72 allows the greens supervisor to provide mowing instructions to the operator. Communication panel 72 is constructed from plastic or other suitable material to allow it to be written on in grease pencil or dry erase marker and hence, the instructions can be changed on a daily basis. As shown in a preferred embodiment, communication panel includes a plurality of zones 138 which define particular operations and operating parameters and a plurality of blank zones 140 in which the supervisor may mark instructions. Also included is a dial indicator 142 which allows the supervisor to indicate the direction in which to mow a particular green. For example, a line between 9 and 3 would indicate the direction in which the operator should traverse the green while mowing, and circling CW or CCW indicates the direction in which to perform a clean-up cut if required. Several communication panels 72 may be prepared and selectively inserted behind the clear plastic panel, or otherwise affixed to control support arm 66, by the operator. Hence, the supervisor may prepare all of the instructions that the operator may need for an entire day at one time, and the operator may view the instructions while operating the machines to ensure proper mowing of the green.

Figure 4:
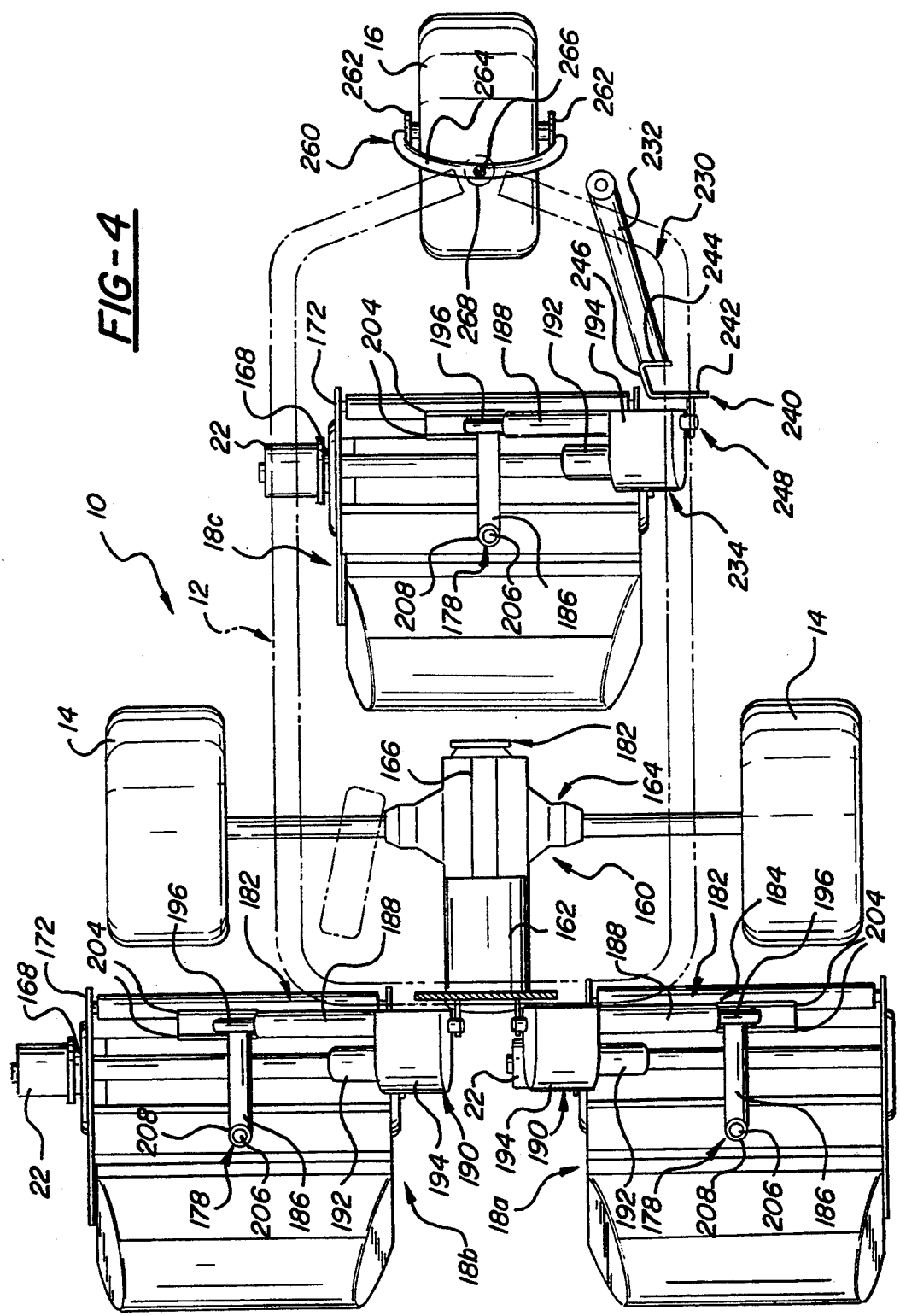
FIG. 4 is a top view similar to FIG. 3 illustrating, however, features of the mower generally disposed below the frame member and illustrating the drive axle partially broken away to show the internal gear arrangement.

FIG. 4 shows the prime mover 160 for mower 10 which includes a series-wound DC motor 162 adapted to deliver driving torque via drive axle 164 to each of the drive wheels 14. More particularly, drive motor 162 engages a gear reduction assembly 166 which includes a differential gear assembly housed therein. Gear reduction assembly 166 provides driving torque to a pair of shafts which are journally supported within drive axle 164 and which are operable to deliver drive torque to wheels 14. A suitable drive motor 162 is a 48 volt 2 horsepower (HP) at 2800 revolutions per minute (RPM) DC motor, and a suitable drive axle 164 is a 15.67:1 gear reduction axle adapted to have motor 162 secured directly thereto. A single brake assembly 182 is secured to drive axle 164 and is interconnected with brake pedal 78 for providing braking means.

As will be appreciated, the weight of prime mover 160 is isolated toward a forward portion of mower 10 and substantially over the front drive wheels 14. More particularly, drive motor 162 is mounted to drive axle 164 forward of the axis of rotation of drive wheels 14 such that the majority of the weight of drive motor 162 is distribute to the front drive wheels 14. The remaining weight of prime mover 160, i.e., the weight of the drive axle 164 is substantially distributed along the axis of rotation of drive wheels 14.

Figure 5:
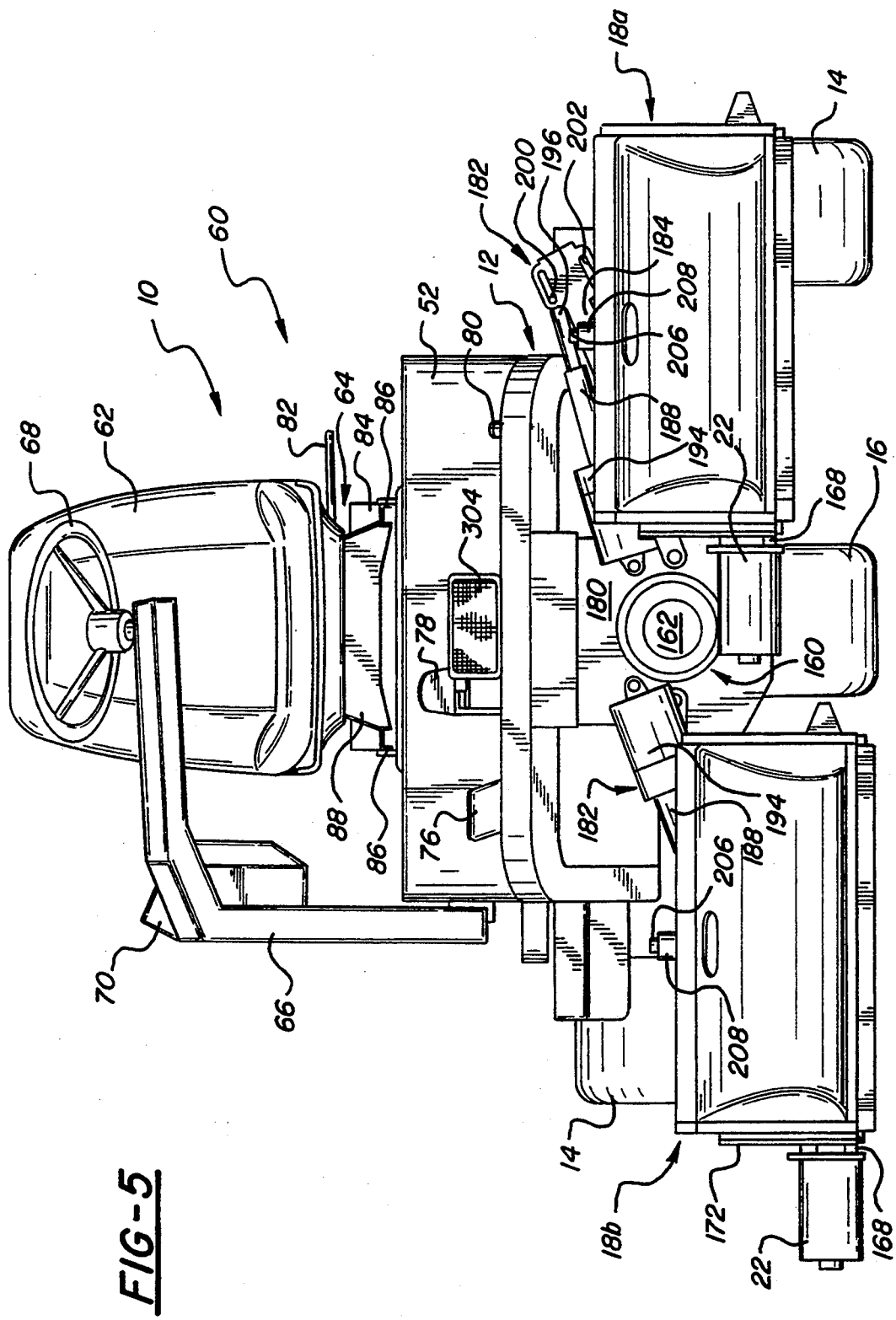
FIG. 5 is a front view of the electric drive riding greens mower of the present invention and further illustrates two of the reel type mowers, one of which is in a lowered operating position and the other of which is in a raised non-operative or transport position.
Figure 6:
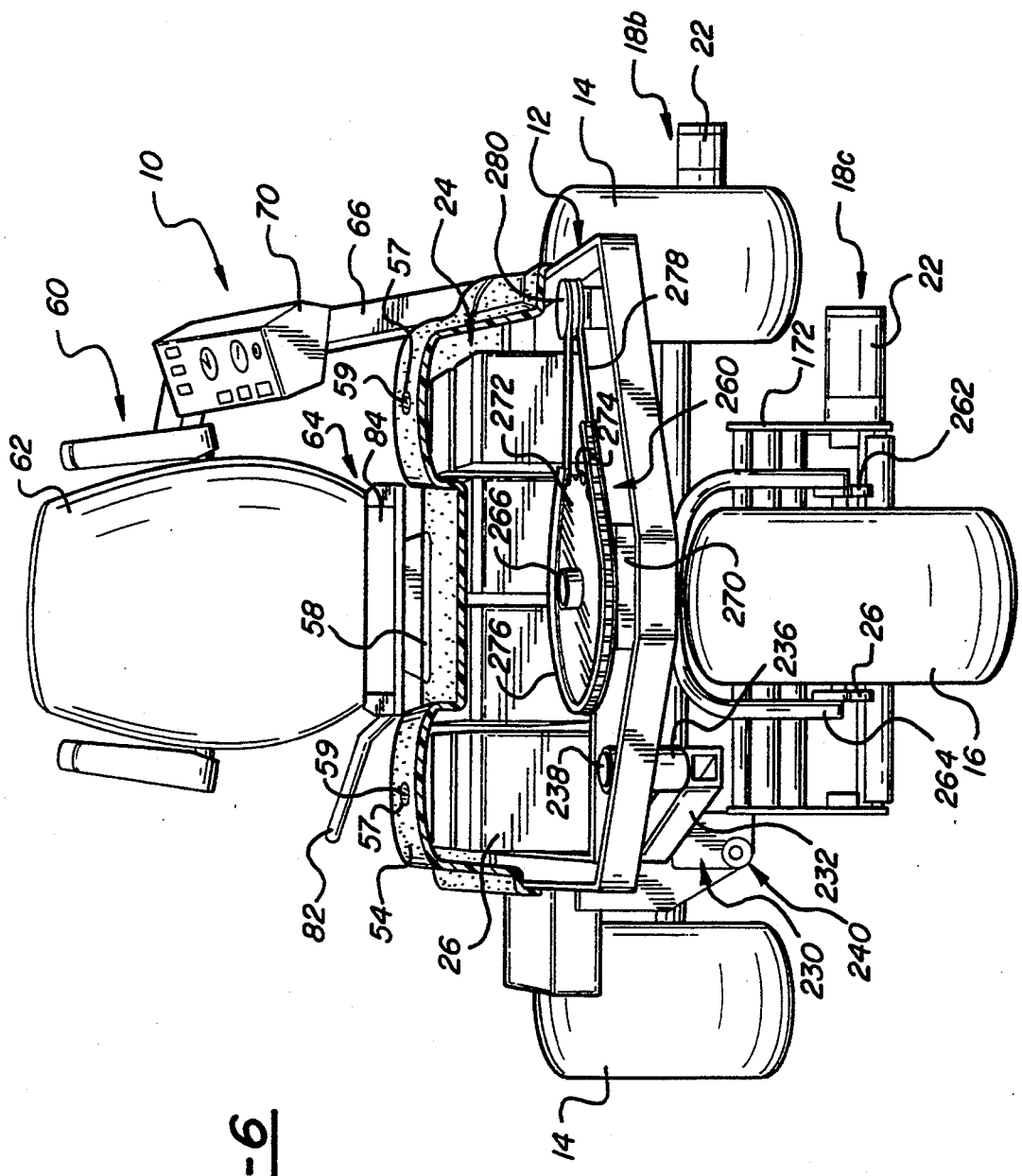
FIG. 6 is a rear view of the electric drive riding greens mower of the present invention with the battery Cover partially broken away to show the batteries and the seat support assembly.
Figure 9:
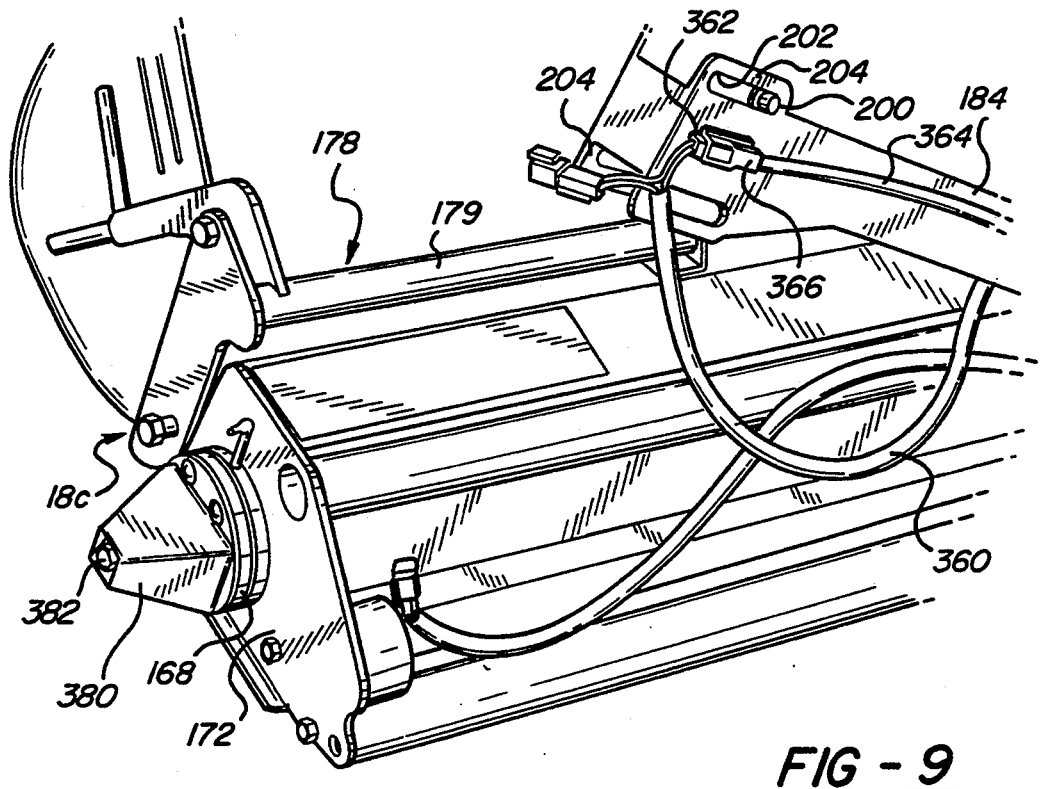
FIG. 9 is an enlarged perspective view of one of the reel lawn mowers illustrating the lifting mechanism, the wiring connections and the external backlapping motor mount cover.

As best seen in FIGS. 5 and 15, drive motor 162 is mounted directly to drive axle 164 and forward thereof. Drive axle 164 is secured to mower 10 via threaded fasteners to brackets 178 suitably secured to an outer portion of frame 12. Mounting bracket 180 is provided and adapted to support a pair of reel lift assemblies 190 for supporting reel lawn mower 18a and 18b to a forward portion of mower 10. Each of the reel lift assemblies 190 include an arm member 184 pivotably supported at one end to mounting bracket 180 and fitted with a forwardly extending support member 186 including a sleeve 188 at the other end. Reel lift assemblies 190 each include a reel lift motor 192 supported to a case 194 and an actuating shaft 196 supported for axial movement relative to sleeve 188 secured to case 194. Reel lift motor 192 drives a ball screw assembly (not shown) housed within case 194 which causes linear movement of shaft 196 relative to sleeve 188. A distal end of shaft 196 includes a bore 198 through which a pin 200 is secured with pin 200 also engaging a pair of slots 202 formed through plates 204 secured to arm 184. As best seen in FIG. 9, reel mower motor 22 is directly mounted to a bearing housing portion 168 of the reel mowers 18a-18c and is directly coupled to the cutting cylinder (not shown). The cutting cylinder is journally supported within the reel mower frame 172 which is adapted to a pull frame 178 in a known manner. Pull frame 178 includes a transverse frame member 179 and a steering shaft 206 which is journally supported on arm 186 by sleeve 208 in a known manner as shown in FIG. 4. In operation, linear movement of shaft 196 in a first direction causes engagement of pin 200 with slots 202 and an upward pivoting movement of arm 184 about mounting bracket 180 and hence a lifting of the associated reel mower from a lowered operative position to a raised non-operative position. Similarly, linear movement of actuating shaft 196 in a second direction causes a downward pivoting movement of 184 arm about mounting bracket 180 and a lowering of the associated reel mower to the operative position. Slots 202 are sized to permit an amount of upward and downward travel of the reel mower in the operative position such that the reel mower may traverse undulating terrain without binding against the pin 200.

FIGS. 1, 4, 7, 8 and 15 illustrate the center reel mower 18c pivoting mount 230. Pivoting mount 230 includes an arm member 232 to which a lift actuation mechanism 234, similar to that previously described, is secured to a first end. A second end of arm member 232 is pivotably mounted to a rear portion of frame 12. More particularly, a sleeve 236 is secured, such as by welding, to a rear portion of frame 12. Journally received within the sleeve 236 is a swivel pin 238 which is secured to the second end of arm member 232 thereby allowing pivoting motion of arm member 232 about a vertical axis located at a rearward portion of frame 12. In this manner, center reel 18c may be pivoted from an operative position below frame 12 to a service position adjacent frame 12. FIG. 8 shows reel mower 18c pivoted midway between the operative position and the service position.

With particular reference to FIGS. 7 and 8, a bracket member 240 is secured to the first end of arm member 232. Bracket member 240 includes first and second transversely extending vertical flanges 242 and 244, respectively. An upper portion of flange 242 further includes a rearwardly extending portion 246 to which a latch assembly 248 is secured. Latch assembly 248 includes an over-center toggle member 250 and a hook 252 secured thereto. An upper portion of hook 252 is formed with a substantially right angle bend portion 254 which projects through an aperture 256 formed in the upper portion of flange 242. Bend portion 254 is oriented to engage a catch 258 secured to a side portion of frame 12. A damping load is applied between hook 252 and catch 258 by over-center toggle 250 for securing arm member 232 in its operative position with respect to frame 12. Lift actuator assembly 234 is pivotally secured to bracket 242, and operates as described above for raising and lowering center reel mower 18c.

FIGS. 1–4 and 6 show the mounting of rear steerable wheel 16, the steering mechanism 260 and the interconnection between steering mechanism 260 and steering wheel 68. As can be seen, rear wheel 16 is mounted to a pair of brackets 262 secured to a "U" shaped yoke member 264. Yoke member 264 includes an upper spindle portion 266 which is journally supported within sleeve 268 secured to brackets 270 and which in turn are secured to frame 12. Spindle 266 projects upwardly through sleeve 268 such that a portion extends above frame 12 for allowing a steering sprocket 272 to be secured thereto. Steering sprocket 272 has a plurality of teeth 274 formed along its circumference for engaging an open ended chain 276. Cable assembly 278 is secured to the ends of chain 276 and is routed along a plurality of pulleys, examples of which are shown at 280 and 282, respectively, to steering wheel 68. It should thus be appreciated that rotation of steering wheel 68 causes concomitant movement of cable assembly 278 and hence rotation of steering sprocket 272 about sprocket axis "S" for turning rear wheel 16 and for steering mower 10. Rear wheel 16 is positioned aft of sprocket axis "S" such that it trails sprocket axis "S" for preventing flutter and enhancing stability of rear wheel 16. Cable assembly 278 can be routed through control support arm 66 which is constructed from tubular materials reducing cost and weight through the elimination of brackets and protective sheathing.

Figure 17A:
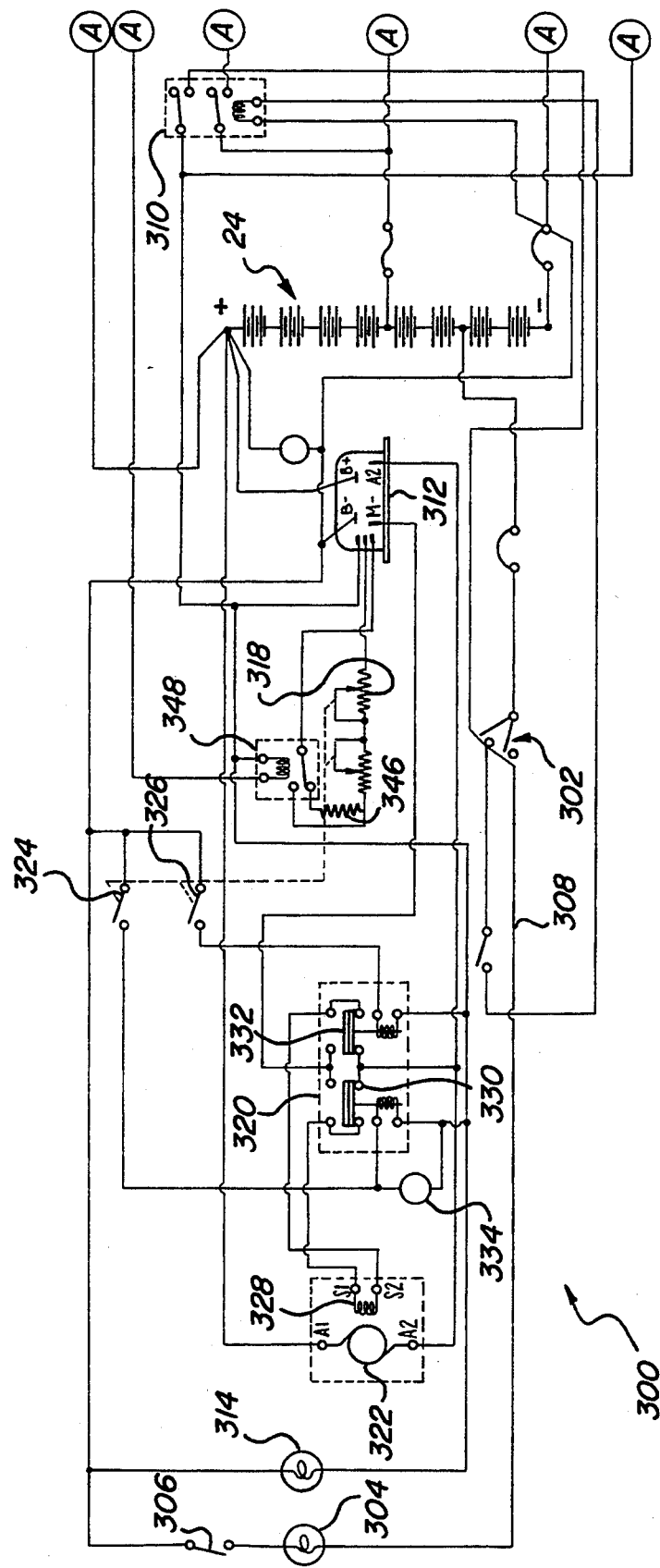
FIGS. 17A and 17B are schematic circuit diagrams illustrating the electrical connections and functional control elements of the electric drive riding greens mower of the present invention.
Figure 17B:
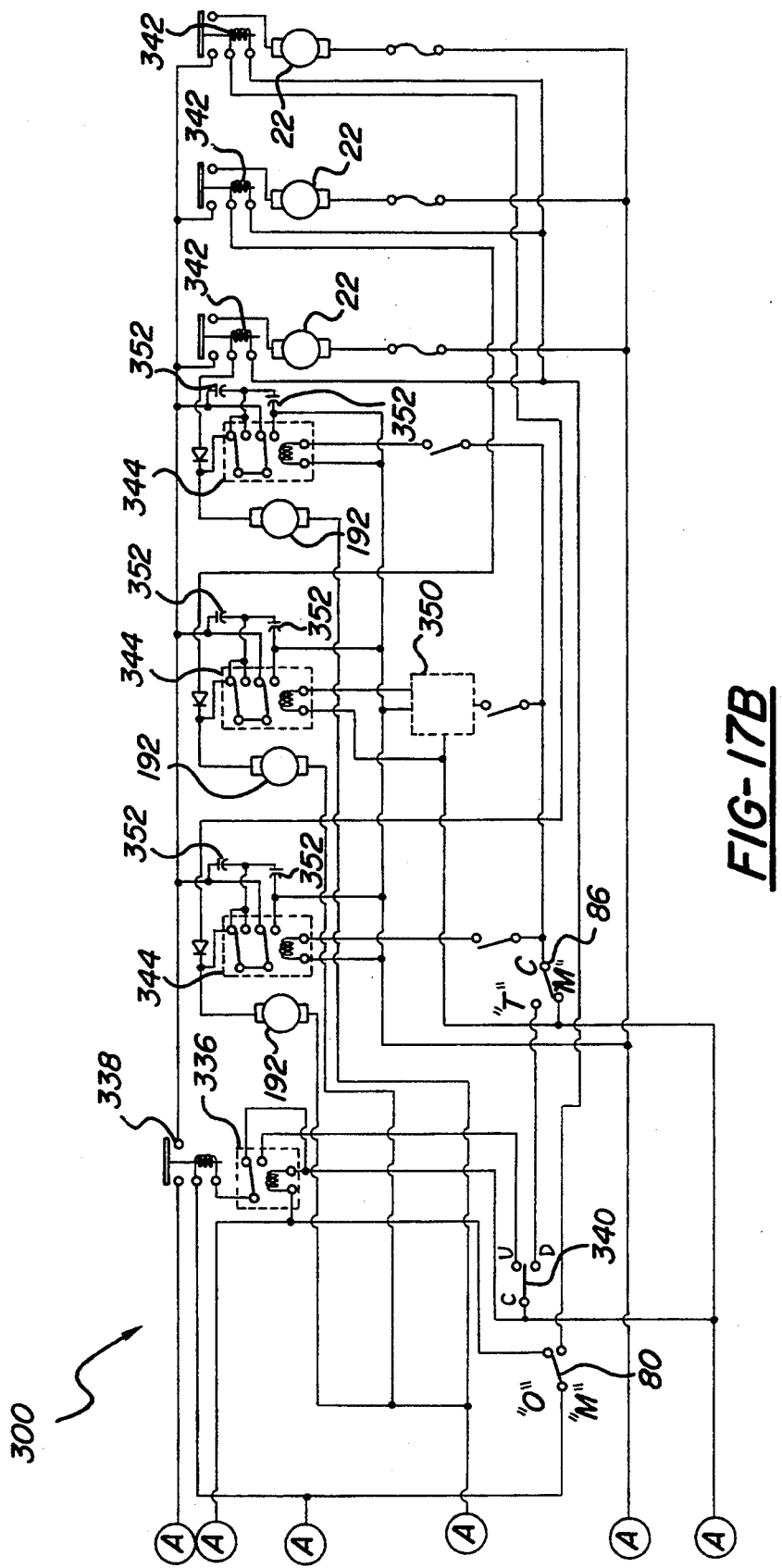

FIGS. 17A and 17B show in schematic form the power and control circuit 300 for supplying electrical energy from battery power source 24 to reel mower motors 22, reel lift motors 192 and drive motor 162 previously described. Circuit 300 is arranged to provide twelve and twenty-four control voltages to a plurality of vectro-mechanical relay devices, while power devices are controlled at forty-eight and twenty-four volts as will be described below. It should also be understood that solid state devices may be substituted for those described without departing from the fair scope of the invention.

Circuit 300 includes a lock-out, and the operator must insert a key into key switch 302 to activate mower 10. Key switch 302 is a two position dual pole switch which is closed in an ignition on position. When closed, operation of the headlight 304 through activation of headlight switch 306 is permitted. Further operation of mower 10 is prohibited unless seat switch 308 is closed, i.e., unless an operator is sitting in seat 68. Upon closing of key switch 302 and seat switch 308, key-switch-on relay 310 is energized at twelve volts which closes a first contactor for supplying a twelve volt signal to the motor controller 312 and for energizing a power on lamp 314. Energization of key-switch-on relay 310 also closes a second contactor which is necessary for supplying twenty-four volts to the reel mower contactor coils 342 and the reel lift motors, as will be described.

To effect driving of mower 10, with the key-switch-on relay 310 energized and the seat switch closed, drive motor 162 is controlled through cooperation of motor controller 312, foot actuated potentiometer 318 and forward/reverse contactor 320. Battery voltage is supplied to motor controller 312, which is operable to split the battery voltage and supply foot actuated potentiometer 318 with an input voltage. Foot actuated potentiometer 318 divides this input voltage depending on the position of drive pedal 76 and a "tap" voltage is returned to motor controller 312 which responds by modulating the current flowing through drive motor field coil 328 in proportion to the tap voltage for controlling the output speed of drive motor 162.

As previously mentioned, drive motor 162 is a D.C. series-wound reversible motor. A first pole of drive motor 162 is connected directly to the full battery power source 24, i.e., forty-eight volts. The second pole of drive motor 162 is connected to the motor controller 312 which provides and interruptable ground connection. Motor controller 312 in cooperation with forward/reverse contactor 320, forward microswitch 324 and reverse microswitch 326 supplies and modulates field current to drive motor field winding 328 for controlling drive motor 162 speed. Forward microswitch 324 and reverse microswitch 326 are normally open and are disposed adjacent drive pedal 76 such that rotation of drive pedal 76 in a first direction closes forward microswitch 324 while rotation of drive pedal 76 in the opposite direction closes reverse microswitch 326. It should be noted that foot actuated potentiometer 318 is operable in both directions to divide the input voltage and to supply a tap voltage to motor controller 312. In this regard, foot actuated potentiometer 318 is operable to control mower 10 ground speed in both forward and reverse directions. Forward/reverse contactor 320 (shown completely de-energized in FIG. 17A) is a four position, four pole dual input relay. Forward and reverse cause closing of forward and reverse contactors, 330 and 332, respectively, within forward/reverse contactor 320. When the forward contactor 330 is closed and reverse contactor 332 is open, field current is applied from S1 to S2 on motor field winding 328, and drive motor 162 operates in a forward mode in response to current flow through drive motor armature winding 322. Similarly, when reverse contactor 332 is closed and forward contactor 330 is open, field current is applied from S2 to S1 on motor field winding 328, and drive motor 162 operates in a forward direction in response to current flow through: drive motor armature winding 322. Also included and activated when forward contactor is closed, is hour meter 334 for logging the hours of operation of mower 10.

With reference then to FIG. 17B, when the key switch on relay 311 is energized and seat switch 308 is closed, operation of the reel mowers is conducted primarily through activation and deactivation of mow switch 80 and transport switch 86. Mow switch 80 is a foot operated dual pole two position switch while transport switch 86 is a dual pole two position switch mounted to control panel 70.

Mower 10 is designed to operate in two modes based on the position of transport switch 86. When in the transport mode, mower 10 is operable to travel at higher speeds, the reel mowers may be raised and lowered, but reel mower operation through actuation of mow switch 80 is inhibited. In a mow mode, i.e., transport switch 86 in the mow position, mower 10 operates at a lower mow speed, mow switch 80 is operable to activate and deactivate the reel mowers for mowing. The reel mowers may still be raised manually through operation of a second switch. Each of the reel mowers 18a–18c operate in essentially the same manner, and the following discussion for actuating a single reel mower is applicable to each.

With transport switch 86 in the transport mode, mow relay 336 is energized and the coil of main contactor 338 is switched to an open/de-energized state. Also, reel mower contactor coil 342 is also in an open/de-energized state as is the reel mower relay 344. Raise/lower switch 340 is a three position switch which is normally open. If moved to the raise "u" position, main contactor coil 338 is energized introducing a +24 volt differential across the reel lift motor 192 and it operates to raise the reel mower as previously described. If moved to the lower "d" position, the reel mower relay coil is energized, and −24 volts is introduced across reel lift motor 192 which operates to lower the reel mower as previously described. During each of these operations the reel mower motor contactor coil remains in an open/de-energized state, and therefore, the reel mower does not operate.

With continued reference to FIG. 17B and with transport switch 86 in the mow mode, switching mow Switch 80 to mow de-energizes mow relay coil 330. Main contactor 338 coil is energized and its contacts close. In addition, reel mower contactor coil 342 is energized which closes its contacts and introduces +48 volts across the reel mower motor 22 causing it to operate. Also, closing reel mower relay 344 contactors introduces −24 volts across reel lift motor 192 which lowers the reel mower into contact with the green and mowing begins. Lastly, with transport switch 86 in the mow mode, potentiometer relay 348 is de-energized thereby moving its contacts and introducing an additional resistor 346 in series with foot actuated potentiometer 318 reducing the tap voltage seen by motor controller 312. Motor controller 312, in response to the reduced tap voltage, reduces the current flow through drive motor armature winding 322 and likewise reduces the speed of the mower 10 to mowing speed.

Upon completing a pass across the green being mowed, the operator switches mow switch 80 to off "O". This de-energizes reel mower contactor coil 342 and the reel mower motor ceases operating and are raised. Also, the reel mower relay 344 is de-energized, and mow relay 336 is energized opening main contactor 338. With both transport switch 86 in the mow mode, and mow switch 80 in the mow position, raise switch 340 remains operable, as described, to raise and lower reel mowers 18a–18c. When generally mowing, transport switch 86 is left in the mow position and control of reel mowers 18a–18c is controlled through selective activation of mow switch 80. Upon completing mowing, switching of transport switch 86 to the transport mode energizes potentiometer relay 352 moving its contacts and taking resistor 346 out of series with foot actuated potentiometer 318 and allowing mower 10 to drive at higher speeds, and disables mowers 18a–18c operation as described.

As previously discussed, reel mowers 18a, 18b and 18c are positioned on frame 12 in a staggered arrangement. That is, reel mowers 18a and 18b are forward while reel mower 18c is centrally located. If all three mowers were to activate simultaneously, an irregular cutting pattern would be created which would reduce efficiency by requiring additional clean up cuts. Circuit 300 includes an on/off delay timer 350 for reel mower 18c. In operation, on/off delay timer 350 delays the time before reel mower 18c is activated and lowered such that it starts cutting at substantially the same position as reel mowers 18a and 18b. Likewise, on/off delay timer 350 delays the deactivation of reel mower 18c such that it stops cutting at substantially the same position as :reel mowers 18a and 18b. It should be understood that on/off delay timer 350 may be a simple RC timer circuit, a 555 timer chip, or digital timer circuit, which is preferred. FIG. 16 illustrates the on/off delay feature for reel mowers 18a, 18b and 18c. The high going trace indicates mower activation, while a low going trace indicates mower deactivation.

The foregoing generally describes the details of the structure, function and operation of mower 10. The following describe additional advantages and features of mower 10.

Of considerable concern to golf course superintendents is the weight of a greens mower. As mentioned above, it is important to avoid compaction of the soil underneath the green turf, and in accordance with this consideration every aspect of mower 10 is designed with an eye towards reducing weight wherever and whenever possible. FIGS. 1–6 and 15 illustrate the frame assembly and the mounting of the prime mover and other frame components. Mower 10 incorporates a single drive motor 162 adapted to drive the forward driven wheels 14 through drive axle 164, thus reducing weight over having multiple drive motors. In addition, the frame is constructed from tubular frame members. The tubular frame provides for enhancing structural rigidity of the electric drive riding greens mower 10 while reducing weight. In addition, the tubular frame permits routing of wiring harness 126 and steering cable assembly 278 through the frame 12 and control support arm 66, respectively, to the various positions on the riding greens mower. This advantageously provides protection for wiring harness 126 and steering cable assembly 278 without additional sheathing, and helps to reduce the number of brackets and retainers necessary to secure the wiring. Each of these features assist in the overall goal of reducing the weight of the mower.

Many of the features of the frame 12 are dual or multiple purpose. The foot deck 174 also defines the electrical component mounting panel 122 and electrical compartment 124 all of which is integrally constructed into frame 12. The battery support structure 40 including vertical plates 48 and 52 also serves to support seat 62. The control support arm 66 supports steering wheel 68 and control panel 70 as well as functions as a conduit for steering cable assembly 278.

Mower 10 is designed with an increased tread width, i.e., the distance between centerlines of front drive wheels 14. This arrangement improves stability and ensures that rear steerable wheel 16 remains within the arc defined by drive wheels 14 during turns. Thus, the operator is assured that if drive wheels 14 have cleared a hazard, rear steerable wheel 16 will similarly clear the hazard. The positioning of rear steerable wheel 16, however, also takes into account the desirability of elongating the wheel base to enhance stability; of mower 10. Hence, rear steerable wheel 16 is positioned as far aft as possible while still achieving the above goals with the wheel base being approximately in the ratio of 1:1 to the tread width.

Mower 10 is also designed to be highly serviceable. As noted above, batter cover 54 is vented so that battery power source 24 may be recharged without having to remove battery cover 54. The seat 62 is pivotable to allow access to battery power source. Also, as described, center reel mower 18c is secured to pivoting mount 230 so that it is easily pivoted out from under mower 10 for service. Furthermore, a majority of the electrical components are conveniently mounted to a pivoting panel such that they are easily accessed for service.

With reference to FIG. 9, electrical energy is communicated to the reel mowers 18a–18c from battery power source 24 along lead 364 and to the reel mower via lead 360. To provide means for backlapping the reel mowers, connectors 366 and 362 joining leads are disconnected. Also disconnected is a main power connector which isolates battery power source 24 from the rest of the electrical system. A backlapping accessory box which includes a pair of leads, an on/off switch and a knob connected to a potentiometer disposed within the box. A first lead of the accessory box is connected to an external power source and the other lead is connected to lead 360 at connector 362. By turning the backlapping accessory on, power from the external power source is provide to drive the reel mower in a reverse manner. The knob can be rotated to adjust the potentiometer such that the speed at which the reel mower is driven in reverse can be adjusted. Hence, the reel mowers may be conveniently backlapped without removing them from mower 10. As should be appreciated, the backlapping accessory could also be adapted to receive power from battery source 24 eliminating the need for an external power source.

Also shown in FIG. 9 is reel mower end cover 380. End cover 380 covers an elongated end portion 382 of the shaft of a reel cylinder. As an alternate method of backlapping, cover 380 is adapted to receive an auxiliary reel mower motor which engages shaft end portion 382. The auxiliary reel mower motor is simply a standard reel mower motor adapted to be removably secured to the reel mower and cover 382. Electrical energy is provide from an adjustable external source, or from battery power source 24 via lead 360 through an adjustment means, and auxiliary reel mower motor drives the reel mower in reverse for providing a second means for backlapping the reel mower.

While specific embodiments have been shown and described in detail to illustrate the principles of the electric drive riding greens mower of the present invention, it will be understood that the invention may be embodied otherwise without departing from such principles. For example, one skilled in the art will readily recognize from such discussion and from the accompanying drawings and claims that various changes, modifications and variations can be made therein without departing from the spirit and scope of the invention as described in the following claims.

What is claimed is:

1. A gang mower comprising:
   a frame member constructed substantially from generally tubular outer members and having a generally rectangular configuration with an open center area and a plurality of transverse support members extending generally between the outer tubular members;
   a plurality of ground engaging wheels supporting the frame member;
   a battery power source;
   a plurality of reel type lawn mowers located forward of the ground engaging wheels and supported from the frame, the reel type lawn mowers being moveable between a raised non-operative position and a lowered operative position in which the reel type lawn mowers engage the ground, the reel type mowers being driven by electric motors receiving electrical power from the battery power source; and
   a prime mover including an electric motor powered by electrical energy from the battery power source and including a drive axle positioned between two of the ground engaging wheels adapted to provide driving torque to at least one of the ground engaging wheels, the electric motor being substantially positioned forward of the drive axle.

2. The gang mower of claim 1 wherein the gang mower further includes at least three ground engaging wheels and the drive axle positioned between the two ground engaging wheels delivers driving torque to each of the two wheels.

3. The gang mower of claim 2 wherein the drive axle is positioned between the battery power source and the electric motor.

4. The gang mower of claim 1 wherein the frame member supports an operator foot deck.

5. The gang mower of claim 4 wherein the battery power source is secured to at least one of the transverse frame members.

6. The gang mower of claim 1 wherein at least one of the reel type lawn mowers is positioned near the open center area of the frame member and is supported from a rearward portion of the frame member.

7. The gang mower of claim 6 further comprising a pivoting support structure for allowing at least One reel type lawn mower to be pivoted in a generally horizontal direction from a raised non-operable position under the frame member to a service position substantially outside of the frame member.

8. The gang mower of claim 7 wherein the pivoting support structure includes a single arm member from which the rear center reel mower is supported.

9. The gang mower of claim 7 wherein the pivoting support structure is primarily attached to a rearward portion of the frame member located behind the non-operating position of the at least one reel type lawn mower.

10. A gang mower comprising:
 a frame member substantially constructed from generally tubular members and having a generally rectangular configuration with an open center and a plurality of transverse support members supported between the tubular members;
 a plurality of ground engaging wheels supporting the frame member with a forward pair of ground engaging wheels located proximately to a forward portion of the frame member and another of the plurality of ground engaging wheels located proximately to a rearward portion of the frame member;
 a plurality of reel type lawn mowers supported from the frame, at least one of the plurality of mowers being positioned forward of the ground engaging wheels and at least another of the plurality of reel type lawn .mowers being positioned behind the forward pair of wheels;
 a prime mover adapted to provide driving torque to at least one of the ground engaging wheels; and
 an electric motor positioned forward of the ground engaging wheels for driving the prime mover,
 wherein the transverse support members are further operable for supporting a fuel source, and a control unit, and
 wherein the frame member supports a pivotable mounting for at least one of the ground engaging wheels.

11. The gang mower of claim 10 wherein at least one of the reel type lawn mowers is pivotably mounted to the frame and wherein the pivotable mount is supported at least in part by one of the transverse support members.

12. The gang mower of claim 10 wherein the transverse mounted support members are further operable for supporting an operator.

13. A gang mower comprising:
 a frame member having a generally rectangular configuration with a forward portion, a rearward portion, an open center and a plurality of transverse support members;
 three ground engaging wheels supporting the frame member;
 a battery power source;
 a plurality of reel type lawn mowers supported in part by the frame member and, located forward of the ground engaging wheels and supported from the frame member, the reel mowers including and being driven by electric motors receiving electrical power from the battery power source;
 a plurality of reel lift mechanisms, one for each reel-type lawn mowers, with each being connected to a respective reel type lawn mower and to the frame member, for moving each lawn mower between a lowered non-operating position and a raised non-operative position;
 a prime mover adapted to provide driving torque to at least one of the ground engaging wheels; and
 wherein two of the three wheels are secured to a forward portion of the frame, and one of the three wheels is pivotably mounted to a rear portion of the frame such that pivoting motion of the one wheel allows for steering of the gang mower and wherein the track defined by the one wheel along the ground is maintained within the track defined by the two wheels along the ground and one of the plurality of reel type mowers is positioned forward of the two wheels and another of the plurality of reel type mowers is positioned between the two and one wheels.

14. The gang mower of claim 13 wherein the prime mover comprises a drive axle joining the two wheels and for delivering driving torque substantially equally thereto and an electric motor for providing driving torque to the drive axle.

15. The gang mower of claim 13 wherein the axis of rotation of the one wheel is rearward of the pivotable mounting of the one wheel to the frame.

16. The gang mower of claim 13 wherein the two wheels are separated along a common axis at the forward portion of the gang mower and wherein the one wheel is positioned in 1:1 relationship to separation of the two wheels at the rearward portion of the gang mower.

17. The gang mower of claim 13 wherein at least a plurality of the reel lift mechanism each include an electric motor.

18. A gang mower comprising:
 a frame having a forward end and a rearward end supported on a plurality of ground engaging wheels;
 at least three ground-engaging wheels, with at least a first one of the wheels being positioned near the forward end of the frame;
 a plurality of reel type lawn mowers supported from the frame and each including and being driven by its own electric motor, at least one of the plurality of mowers being substantially positioned forward of the forward end of the frame and at least another of the plurality of mowers being positioned between the forward and rear ends of the frame;
 an electric drive motor operable to provide driving torque to at least the first one of the ground engaging wheels, the electric drive motor being positioned forward of a central axis of rotation of the first one of ground engaging wheel; and
 a batter power source for supplying electrical energy to the electric drive motor and the reel type lawn mowers.

19. The gang mower of claim 18 further comprising electric lift motors associated with each of the reel type lawn mowers for moving the reel type lawn mowers between a raised non-operative position and a lowered operative position in which the reel type lawn mowers: engage the ground.

20. The gang mower of claim 18 further comprising control means for selectively operating the reel type lawn mowers.

21. The gang mower of claim 20 wherein the control means is further operable for selectively operating individual reel type lawn mowers from the plurality of reel type lawn mowers.

22. The gang mower of claim 21 where the control means is further operable for activating and deactivating the selected individual reel type lawn mowers through a single actuation means.

23. The gang mower of claim 20 wherein the control means is further operable to selectively time delay activation and deactivation of selective individual reel type lawn mowers in relation to the activation and deactivation of the remaining reel type lawn mowers.

24. The gang mower of claim 18 wherein the battery power source provides between about 36 volts and 60 volts of electrical force.

25. The gang mower of claim 24 wherein the battery power source is rechargeable.

26. The gang mower of claim 25 further comprising a cover for substantially enclosing the battery power source, the cover further including vents for allowing the escape of gases produced during the charging of the battery power source.

27. The gang mower of claim 26 wherein the cover is removable for exposing the battery power source.

28. The gang mower of claim 18 wherein the drive motor is further operable to provide braking action.

29. The gang mower of claim 18 wherein the frame member includes a panel member having a first surface for securing electrical components for controlling the delivery of electrical energy from the battery power to the drive motor and the reel type lawn mowers thereto, the panel member being pivotably mounted to the frame for pivotable movement between a first position wherein a second surface of the panel member is exposed and the first surface is hidden and a second position wherein in the first surface is exposed for allowing service of the electrical components.

30. The gang mower of claim 29 wherein when the panel member is in the first position the second surface functions as an operator footrest.

31. The gang mower of claim 30 wherein the foot deck further defines a compartment for housing a plurality of electrical components.

32. The gang mower of claim 31 wherein the compartment further includes a plurality of apertures for providing drainage.

33. The gang mower of claim 18 wherein the frame member is constructed from tubular frame members and wherein the battery power source is connected to the electric drive motor and the reel type lawn mowers by wiring routed through the tubular frame members.

34. The gang mower of claim 18 including three ground engaging wheels, two of the three ground engaging wheels being mounted to a forward portion of the frame member and one of the three ground engaging wheels being pivotably mounted to a rearward portion of the frame, the gang mower further including a steering wheel and means for connecting the steering wheel to the one of the three ground engaging wheels whereby rotation of the steering wheel causes pivoting of the one wheel for steering the gang mower.

35. The gang mower of claim 34 wherein the means for connecting comprises a cable assembly and wherein the frame is constructed from tubular frame members and the cable assembly is disposed within the tubular frame members.

36. The gang mower of claim 18 further comprising means for backlapping the reel type lawn mowers.

37. The gang mower of claim 36 wherein the means for backlapping comprises means for driving the reel type lawn mower electric motor in a reverse direction.

38. The gang mower of claim 37 wherein the means for driving the reel type lawn mower in reverse comprises an adaptor for reversing the polarity of the electrical energy provided to the reel type lawn mower from the battery power source.

39. The gang mower of claim 36 wherein the means for driving the reel type lawn mower in reverse comprises means for providing reverse polarity electrical energy to the reel type lawn mower from an external source.

40. The gang mower of claim 36 wherein the means for backlapping the reel type lawn mowers comprises means for connecting an external driving source to the reel type mower for operating the reel type lawn mower in a backlapping mode.

41. The gang mower of claim 40 wherein the external driving source comprises an electric backlapping motor adapted to the reel type lawn mower.

42. The gang mower of claim 41 wherein the backlapping motor is provided with electrical energy from the battery power source.

43. The gang mower of claim 41 wherein the backlapping motor is provided with electrical energy from an external source.

44. A triplex gang mower comprising:
a frame member having a forward end portion and a rearward end portion, the frame member being supported upon three main ground engaging wheels, two of which are near the forward end portion of the frame member and one of which is rearward of the frame member;
a battery power source mounted to the frame member and substantially supported by the three main ground engaging wheels;
three reel type lawn mowers supported from the frame member the reel type lawn mowers each being moveable between a raised non-operative position and a lowered operative position in which the reel type lawn mower engages the ground each of the reel type mowers including and being driven by individual electric motors receiving electrical power from the battery power source, and two of the reel type lawn mowers being mounted in front of the two forward ground-engaging wheels, and a rear reel type lawn mower normally being located behind the two forward ground-engaging wheels near a center region of the gang mower when the triplex mower is in use; and
a prime mover comprising a drive axle connected to and transversely positioned near the forward end portion of the frame member, for driving the two forward wheels, and
an electric motor supplied with electrical energy from the battery power source and adapted to provide driving torque to the two forward ground engaging wheels.

45. The gang mower of claim 44 wherein the electric motor of the prime mover is positioned forward of the drive axle and centrally located substantially equidistant from and between two forward wheels and delivers driving torque to each of the two forward wheels.

46. The gang mower of claim 45 wherein the drive axle is positioned between the battery power source and the electric motor.

47. The gang mower of claim 44 wherein the frame member comprises a tubular frame member of a generally rectangular configuration with an open center portion and a plurality of transverse frame members connected across the open center portion.

48. The gang mower of claim 47 wherein the battery power source is secured to at least one of the transverse frame members.

49. The gang mower of claim 44 wherein the rear reel type lawn mower is substantially supported from the rearward portion of the frame member.

50. The gang mower of claim 49 wherein the frame support arrangement for the at least one of the reel type lawn mowers includes a pivoting support structure for allowing the at least one reel type lawn mower to be pivoted from an operable position to a service position.

* * * * *

UNITED STATES PATENT AND TRADEMARK OFFICE
CERTIFICATE OF CORRECTION

PATENT NO. : 5,406,778
DATED : April 18, 1995
INVENTOR(S) : Mark E. Lamb et al.

Page 1 of 2

It is certified that error appears in the above-indentified patent and that said Letters Patent is hereby corrected as shown below:

Title Page, Column 2, Abstract, replace "protect" with --protects--.

Column 4, line 10, replace "Cover" with --cover--.

Column 5, line 31, replace "bakery" with --battery--.

Column 5, line 35, after "such" add --as--.

Column 5, line 53, replace ":" with a -.-

Column 6, line 50, replace "from" with --frame--.

Column 7, line 20, after "well" add "as".

Column 7, line 34, replace "of plurality" with --plurality of--.

Column 8, line 25, replace "distribute" with --distributed--.

Column 9, line 35, replace "damping" with --clamping--.

Column 10, line 7, replace "vectro" with --electro--.

Column 10, line 48, replace "and" with --an--.

Column 10, line 67, after reverse add --microswitches 324 and 326 are arranged to selectively--.

Column 11, line 10, after through delete --:--.

Column 11, line 55, replace "Switch" with be --switch--.

Column 12, line 7, before "are" add --the reel mowers--.

Column 13, line 23, after stability delete ";".

UNITED STATES PATENT AND TRADEMARK OFFICE
CERTIFICATE OF CORRECTION

PATENT NO. : 5,406,778
DATED : April 18, 1995
INVENTOR(S) : Mark E. Lamb et al.

It is certified that error appears in the above-indentified patent and that said Letters Patent is hereby corrected as shown below:

Column 13, line 29, replace "batter" with --battery--.

Column 13, line 53, replace "provide" with --provided--.

Column 14, line 2, replace "provide" with --provided--.

In the Claims

Column 14, line 2, Claim 7, replace "One" with --one--.

Column 16, line 6, Claim 13, after "ground" insert --,--.

Column 16, line 47, Claim 18, replace "batter" with --battery--.

Column 16, line 54, Claim 19, delete ":".

Column 17, line 19, Claim 29, delete "," before securing.

Column 17, line 26, Claim 29, delete "in".

Column 18, line 26, Claim 44, after "member" add --,--.

Column 18, line 29, Claim 44, after "ground" add --,--.

Signed and Sealed this

Nineteenth Day of December, 1995

Attest:

BRUCE LEHMAN

Attesting Officer

Commissioner of Patents and Trademarks